United States Patent
Tada et al.

(10) Patent No.: US 10,515,565 B2
(45) Date of Patent: Dec. 24, 2019

(54) DRIVING SIMULATION TEST APPARATUS INCLUDING A MOVABLE BODY CAPABLE OF TRANSLATIONAL MOVEMENT

(71) Applicant: TOSHIBA KIKAI KABUSHIKI KAISHA, Tokyo (JP)

(72) Inventors: Atsushi Tada, Numazu (JP); Masaaki Mitsuzono, Numazu (JP)

(73) Assignee: TOSHIBA KIKAI KABUSHIKI KAISHA, Tokyo (JP)

( * ) Notice: Subject to any disclaimer, the term of this patent is extended or adjusted under 35 U.S.C. 154(b) by 295 days.

(21) Appl. No.: 15/403,775

(22) Filed: Jan. 11, 2017

(65) Prior Publication Data

US 2017/0200385 A1    Jul. 13, 2017

(30) Foreign Application Priority Data

Jan. 13, 2016  (JP) ................ 2016-004359
Jan. 13, 2016  (JP) ................ 2016-004360
Aug. 8, 2016   (JP) ................ 2016-155883

(51) Int. Cl.
  *G01M 17/00*   (2006.01)
  *G09B 9/02*    (2006.01)
  *G09B 19/16*   (2006.01)

(52) U.S. Cl.
  CPC .............. *G09B 9/02* (2013.01); *G09B 19/16* (2013.01)

(58) Field of Classification Search
  USPC ................ 73/117.01, 118.01, 118.03, 118.04
  See application file for complete search history.

(56) References Cited

U.S. PATENT DOCUMENTS

| | | | | |
|---|---|---|---|---|
| 5,483,845 A | * | 1/1996 | Stein ................ | G01M 17/0078 73/12.01 |
| 6,110,049 A | * | 8/2000 | Wilkens .............. | G01M 17/007 472/36 |
| 7,098,891 B1 | * | 8/2006 | Pryor ..................... | G06F 3/011 345/158 |
| 2002/0050179 A1 | * | 5/2002 | Buescher .......... | G01M 17/0078 73/865.6 |

(Continued)

FOREIGN PATENT DOCUMENTS

JP     H03-136086     6/1991
JP     2006-351785    12/2006

(Continued)

OTHER PUBLICATIONS

English Language Abstract of JP 2007-033561 published Feb. 8, 2007.

(Continued)

*Primary Examiner* — Eric S. McCall
(74) *Attorney, Agent, or Firm* — DLA Piper LLP US

(57) ABSTRACT

A driving simulation test apparatus includes a movable body, a first translational drive portion that extends along a first direction, a first translational guide portion that extends along the first direction, and a plurality of first bases that extends along the first direction and is spaced from each other in a second direction. The first translational drive portion and the first translational guide portion are aligned in the second direction on each of the plurality of first bases, and the first translational drive portion includes a plurality of first translational drive portions arranged on each of the first bases.

17 Claims, 8 Drawing Sheets

(56) References Cited

U.S. PATENT DOCUMENTS

| | | | | |
|---|---|---|---|---|
| 2007/0251295 A1* | 11/2007 | Rieser | ............... | G01M 17/0078 73/12.07 |
| 2010/0216097 A1* | 8/2010 | Romagnoli | ............... | G09B 9/02 434/35 |
| 2011/0153298 A1* | 6/2011 | Stein | ................. | G01M 17/0074 703/8 |
| 2011/0192241 A1* | 8/2011 | Aiki | ................. | G01M 17/0078 73/865.3 |
| 2015/0004567 A1* | 1/2015 | Minen | ...................... | G09B 1/34 434/62 |
| 2017/0053548 A1* | 2/2017 | Warne | ...................... | G09B 9/12 |

FOREIGN PATENT DOCUMENTS

| | | |
|---|---|---|
| JP | 2007-033561 | 2/2007 |
| JP | 2007-033562 | 2/2007 |
| JP | 2007-033563 | 2/2007 |
| JP | 2010-096829 | 4/2010 |
| JP | 2010-096830 | 4/2010 |
| WO | WO 2014/087172 | 6/2014 |

OTHER PUBLICATIONS

English Language Abstract of JP 2007-033562 published Feb. 8, 2007.

English Language Abstract of JP 2007-033563 published Feb. 8, 2007.

English Language Abstract of JP 2010-096829 published Apr. 30, 2010.

English Language Abstract of JP 2010-096830 published Apr. 30, 2010.

English Language Abstract of JP 2006-351785 published Dec. 28, 2006.

Japanese Office Action (with English language translation) issued in JP 2016-155883 dated Dec. 6, 2016.

English Language Abstract and translation of JP 2006-351785 published Dec. 28, 2006.

English Language Abstract and translation of JP H03-136086 published Jun. 10, 1991.

* cited by examiner

DRIVING SIMULATION TEST APPARATUS INCLUDING A MOVABLE BODY CAPABLE OF TRANSLATIONAL MOVEMENT

CROSS-REFERENCE TO RELATED APPLICATIONS

The priority application numbers JP2016-004359, Driving Simulation Test Apparatus, Jan. 13, 2016, Atsushi Tada and Masaaki Mitsuzono, JP2016-004360, Driving Simulation Test Apparatus, Jan. 13, 2016, Atsushi Tada and Masaaki Mitsuzono, and JP2016-155883, Driving Simulation Test Apparatus, Aug. 8, 2016, Atsushi Tada and Masaaki Mitsuzono, upon which this patent application is based, are hereby incorporated by reference.

BACKGROUND OF THE INVENTION

Field of the Invention

The present invention relates to a driving simulation test apparatus, and more particularly, it relates to a driving simulation test apparatus including a movable body capable of translational movement.

Description of the Background Art

A driving simulation test apparatus that includes a movable body capable of translational movement and makes the movable body perform translational movement according to a driving operation on a simulated vehicle in the movable body is known in general, as disclosed in Japanese Patent Publication No. 2007-033561, for example. Japanese Patent Publication No. 2007-033561 discloses a driving simulation test apparatus including a belt-driven X-direction movement mechanism, a Y-direction movement mechanism placed on the X-direction movement mechanism, and a movable body that includes a dome (movable body) placed on the Y-direction movement mechanism and being translatable in a direction X and a direction Y. In the dome, a simulated vehicle is provided. The X-direction movement mechanism includes six pairs of rails that linearly extend, six belts, each of which is arranged between each of the six pairs of rails, and a motor that rotationally drives each of the belts. The six pairs of rails and the six belts are evenly aligned at intervals (at equal intervals) in the direction Y.

In the belt drive system described in Japanese Patent Publication No. 2007-033561, it is difficult to achieve further improvement in acceleration and deceleration performance and responsiveness. Thus, instead of the belt drive system, a linear motor drive system including a linear motor and a linear movement guide is conceivably employed as a drive source for translational movement.

However, simply replacing the structure in which the six belts and the six rails are evenly arrayed as described in Japanese Patent Publication No. 2007-033561 with the linear motor and the linear movement guide makes it extremely difficult to make an adjustment (parallelism adjustment) for ensuring parallelism between the linear motor and the linear movement guide.

Specifically, the parallelism adjustment is generally made such that the linear motor and the linear movement guide adjacent to each other become parallel to each other while an interval between the linear motor and the linear movement guide is measured, and hence in the structure including a total of eighteen elements as described in Japanese Patent Publication No. 2007-033561, it is necessary to sequentially repeat positional adjustment in order for the elements adjacent to each other to become parallel to each other. Consequently, errors are accumulated up to both ends of the eighteen elements in total, and hence it is extremely difficult to accurately ensure the parallelism.

SUMMARY OF THE INVENTION

The present invention has been proposed in order to solve the aforementioned problem, and an object of the present invention is to provide a driving simulation test apparatus capable of facilitating parallelism adjustment of a linear motor and a linear movement guide even when a translational mechanism includes the linear motor and the linear movement guide.

In order to attain the aforementioned object, a driving simulation test apparatus according to the present invention includes a movable body that includes a simulated vehicle and performs translational movement in a first direction, a first translational drive portion that includes one or more linear motors that extend along the first direction, and makes the movable body perform translational movement in the first direction, a first translational guide portion that includes one or more linear movement guides that extend along the first direction, and serves as a guide when the movable body performs translational movement, and a plurality of first bases that extends along the first direction and is spaced from each other in a second direction perpendicular to the first direction in a planar view. The first translational drive portion and the first translational guide portion are aligned in the second direction on each of the plurality of first bases, and the first translational drive portion includes a plurality of first translational drive portions arranged on each of the first bases.

As hereinabove described, this driving simulation test apparatus includes the first translational drive portion that includes the one or more linear motors that extend along the first direction, and makes the movable body perform translational movement in the first direction, and the first translational guide portion that includes the one or more linear movement guides that extend along the first direction, and serves as a guide when the movable body performs translational movement, the first translational drive portion and the first translational guide portion are aligned in the second direction on each of the plurality of first bases, and the first translational drive portion includes the plurality of first translational drive portions arranged on each of the first bases. Thus, the first translational drive portion and the first translational guide portion can be concentrated on the common first bases. If the number of first translational drive portions and the number of first translational guide portions to be placed on each of the first bases are properly adjusted, a translational mechanism of the movable body that can make the movable body perform translational movement at a high acceleration and deceleration can be constructed simply by arranging around two or three first bases. In this case, the parallelism of all the first bases (the first translational drive portion and the first translational guide portion placed on each of the first bases) can be ensured simply by ensuring parallelism between the adjacent first bases, and hence accumulation of errors can be significantly reduced or prevented. Thus, according to the present invention, the parallelism adjustment of the one or more linear motors and the one or more linear movement guides can be facilitated even when the translational mechanism includes the one or more linear motors and the one or more linear movement guides.

A reason for using the plurality of first bases is now described. In order to ensure the parallelism, all the one or more linear motors and the one or more linear movement guides are preferably directly assembled on a single base, the processing accuracy of which can be ensured. More specifically, when the single base is used, parallelism between respective elements is determined by the processing accuracy of the single base, and hence sufficient parallelism can be ensured depending on a processing apparatus. In the driving simulation test apparatus, however, a large-sized translational mechanism having a longer dimension of several tens of meters and a shorter dimension of at least ten meters may be constructed, and it is difficult in practice to provide the single base sized to fit to the large-sized translational mechanism. According to the present invention, on the other hand, the plurality of first bases is separately provided, whereby the plurality of first bases can be easily applied to the large-sized translational mechanism. The first translational drive portion and the first translational guide portion are concentrated on each of the plurality of first bases, whereby the parallelism between the one or more linear motors (first translational drive portion) and the one or more linear movement guides (first translational guide portion) on each of the first bases can be determined by the processing accuracy with respect to the first bases.

In addition, according to the present invention, the parallelism adjustment is facilitated, and hence parallelism deteriorated across the ages can be promptly restored. Furthermore, high parallelism can be ensured, and hence the feed resistance of the one or more linear movement guides during translational movement can be reduced, and a variation in the clearance of the one or more linear motors can also be significantly reduced or prevented. Consequently, a theoretical thrust force value (design value) to be obtained by the first translational drive portion can be easily stably ensured.

In the aforementioned driving simulation test apparatus, the first bases preferably include two or three first bases aligned at intervals in the second direction. According to this structure, if there are three first bases, for example, the parallelism of each of the first bases can be ensured without generating accumulation of errors simply by adjusting the parallelism of the first bases adjacent to both sides of the central first base with respect to the central first base used as a reference. If there are two first bases, it is only required to adjust the parallelism between the two first bases. Therefore, even when the driving simulation test apparatus includes the first bases having a longer dimension of several tens of meters, the parallelism adjustment can be facilitated. Consequently, sufficient parallelism can be ensured.

In this case, the movable body is preferably supported by a first support supported by the first translational guide portion such that the same is movable in the second direction, and the plurality of first bases preferably includes two first bases arranged symmetrically or substantially symmetrically in the second direction with respect to a center of the first support in the second direction in the planar view. According to this structure, the thrust force of the first translational drive portion in the first direction can be evenly applied to the first support as compared with the case where the first bases are arranged at one position, and hence the moment (horizontal vibration) of the first support in a rotational direction in a horizontal plane (in a plane defined by the first direction and the second direction) can be significantly reduced. Consequently, an increase in feed resistance caused by application of a large horizontal load to the one or more linear movement guides of the first translational guide portion can be significantly reduced or prevented, and hence the movable body (first support) can perform translational movement at a high acceleration and deceleration.

In the aforementioned structure in which the two first bases are arranged symmetrically or substantially symmetrically in the second direction, the two first bases are preferably arranged at positions that correspond to Bessel points of the first support in the second direction or regions around the Bessel points, respectively. When a beam having a weight evenly distributed and being subjected to an equal load is supported at two points, the "Bessel points" are defined as support positions at which the influence of deflation on the entire beam from one end to the other end is minimized. When the two first bases are arranged at the positions that correspond to the Bessel points or the regions around the Bessel points, as described above, the deformation of the first support supported on the first bases (on the first translational guide portion) can be reduced as much as possible while the total number of first bases is reduced. In the driving simulation test apparatus that is translatable in directions X and Y (first and second directions), for example, the first support on which a translational mechanism that moves along a shorter axis is placed is arranged on a translational mechanism that moves along a longer axis, and the movable body (such as the simulated vehicle) is placed on the translational mechanism that moves along the shorter axis. Thus, although the total weight of the first support placed on the translational mechanism that moves along the longer axis, including a placed member such as the movable body is likely to be increased, it is necessary to reduce the weight as much as possible in order to enable high acceleration and deceleration. Therefore, the first support is likely to have a structure that ensures minimum stiffness (i.e. it is deformable). Consequently, the deformation of the first support significantly influences translational movement, and hence the above structure significantly reduces or prevents the deformation such that the movement characteristics and controllability of the first support (the movable body on the first support) can be improved.

The aforementioned structure in which the two first bases are arranged symmetrically or substantially symmetrically in the second direction preferably further includes a second base arranged at a position that passes through the center of the first support in the second direction or near the center of the first support in the second direction, and on the second base, no first translational drive portion is preferably provided, but the first translational guide portion is preferably provided. According to this structure, the first support can be supported and guided by the second base between the two first bases, and hence the deformation of the first support can be more effectively significantly reduced or prevented. Furthermore, no first translational drive portion is provided on the second base, and hence the complication of the apparatus structure can be significantly reduced even when the second base is provided.

In the aforementioned driving simulation test apparatus, the first translational guide portion preferably includes a pair of first translational guide portions arranged near both ends of each of the first bases in the second direction, the first translational drive portion preferably includes a pair of first translational drive portions arranged between the pair of first translational guide portions of each of the first bases, and the pair of first translational drive portions is preferably arranged such that a second distance between the first translational drive portion and the first translational guide portion adjacent to the first translational drive portion is smaller than a first distance between the pair of first translational drive portions. According to this structure, the second distance between the first translational drive portion where a point of application of thrust force is located and the first translational guide portion can be reduced. Consequently, the moment in the rotational direction that acts on the first translational guide portion in the horizontal plane (in the plane defined by the direction X and the direction Y) can be reduced during generation of thrust force. Thus, an increase in the feed resistance of the one or more linear movement guides can be significantly reduced or prevented, and hence the movable body can perform translational movement at a high acceleration and deceleration.

In the aforementioned driving simulation test apparatus, the first translational drive portion preferably includes the linear motors that are integrated with each other. According to this structure, parallelism between the linear motors can be ensured at the stage for assembling and integrating the linear motors, and hence the parallelism adjustment between the linear motors can be finished simply by adjusting parallelism, using the integrated linear motors as a unit. Consequently, the parallelism adjustment of each of the linear motors can be facilitated as compared with the case where the same number of linear motors is arranged individually.

In the aforementioned driving simulation test apparatus, the one or more linear motors are preferably coreless linear motors. According to this structure, whereas in one or more cored linear motors, cogging is generated due to a magnetic attractive force between a magnet and a core such that the uneven thrust force of the one or more linear motors is generated, in the one or more coreless linear motors, generation of the uneven thrust force caused by cogging can be prevented. The thrust force of the one or more coreless linear motors is smaller than that of the one or more cored linear motors, and hence a plurality of coreless linear motors is preferably provided in order to ensure the thrust force. Even in this case, according to the present invention, the parallelism adjustment of each of the coreless linear motors can be facilitated by concentrating and arranging the plurality of coreless linear motors on the common first bases.

The aforementioned driving simulation test apparatus preferably further includes a first support that supports the movable body, a first translational mechanism that includes the first bases, the first translational drive portion, and the first translational guide portion, three of which are provided below the first support, and makes the first support perform translational movement in the first direction, and a pair of first wiring ducts that is arranged below the first support, extends in the first direction, and is connected to the first support to be moved in the first direction following translational movement of the first support in the first direction, and when the first support is located at a center of the first translational mechanism in the planar view, the pair of first wiring ducts is preferably provided symmetrically or substantially symmetrically in the first direction with respect to the first support. According to this structure, even when the first support is moved to any of a first side and a second side in the first direction, the resistance of the first wiring ducts on both sides can be equalized. More specifically, when the first support is moved from the center to the first side in the first direction, a first wiring duct on the first side is pushed to the first side, and the first wiring duct on the second side is pulled to the first side. When the first support is moved from the center to the second side in the first direction, on the other hand, the first wiring duct on the second side is pushed to the second side, and the first wiring duct on the first side is pulled to the second side. Thus, the first wiring ducts on the first side and the second side are symmetrical or substantially symmetrical with respect to the first support, whereby a resistance due to the pair of first wiring ducts, which is to be generated when the first support is moved, can be substantially equalized on the first side and the second side in the first direction. Consequently, according to the present invention, generation of the uneven thrust force of the one or more linear motors caused by an unbalanced resistance involved with the movement of the wiring ducts that follow the translational driving of the movable body can be significantly reduced or prevented.

In the aforementioned driving simulation test apparatus, the pair of first wiring ducts preferably extends from the first support to a first side and a second side in the first direction, respectively, and has lengths substantially equal to each other. According to this structure, the first wiring ducts on the first side and the second side in the first direction can be easily symmetrical or substantially symmetrical to each other. Furthermore, the lengths of the pair of first wiring ducts are substantially equalized, whereby the resistance due to the pair of first wiring ducts, which is to be generated when the first support is moved, can be more accurately uniformized on the first side and the second side in the first direction.

In this case, each of the pair of first wiring ducts preferably houses a plurality of wires distributed such that a total weight of one of the pair of first wiring ducts is substantially equal to a total weight of the other of the pair of first wiring ducts. According to this structure, the total weight of one of the pair of first wiring ducts and the total weight of the other of the pair of first wiring ducts are substantially equalized, whereby the inertial resistance of the first wiring ducts, which is to be generated when the first support is moved along the first direction, can also be substantially equalized on the first side and the second side in the first direction. Thus, the resistance due to the pair of first wiring ducts, which is to be generated when the first support is moved, can be further uniformized.

In the aforementioned driving simulation test apparatus, the pair of first wiring ducts preferably has a folded structure in which the same extends to a first side and a second side in the first direction, respectively, and thereafter is folded back over in the planar view and extends to a central portion of the first support, a first end of each of the pair of first wiring ducts is preferably arranged near the central portion of the first support in the planar view, and a second end of each of the pair of first wiring ducts is preferably fixed to a position below the first end in a vicinity of a central portion of the first translational mechanism in the planar view. According to this structure, when the first support is located at the center of the first translational mechanism, the first end and the second end of each of the pair of first wiring ducts can be arranged near the central portion of the first support immediately below the movable body. Thus, unlike the case where the first end of each of the pair of first wiring ducts is connected to an end of the first support, for example, it is not necessary to wire the wires or the like to a position immediately below the movable body on the first support, and hence the path lengths of the wires or the like to be wired from on the first support to the movable body can be reduced as much as possible. Consequently, the acceleration and deceleration performance can be improved by reducing the weight of members placed on the first translational mechanism while the complication of the apparatus structure (wiring structure) can be significantly reduced or prevented.

The aforementioned driving simulation test apparatus preferably further includes a second translational mechanism that includes a second support that supports the movable body on the first support, a second translational drive portion that is placed on the first support and includes one or more linear motors extending along the second direction, and a second translational guide portion that includes one or more linear movement guides extending along the second direction, and the second translational mechanism that makes the second base perform translational movement in the second direction, and a pair of second wiring ducts that extends in the second direction and is connected to the first support and the second support, and when the first support and the second support are located at centers of the first translational mechanism and the second translational mechanism, respectively, the pair of first wiring ducts and the pair of second wiring ducts are preferably arranged in a cross shape in the planar view. According to this structure, the resistance due to the pair of first wiring ducts, which is to be generated when the first support is moved in the first direction, can be uniformized, and furthermore a resistance due to the pair of second wiring ducts, which is to be generated when the second support is moved in the second direction, can be substantially equalized on a first side and a second side in the second direction. Therefore, even in the structure including a 2-axis translational mechanism capable of moving in the first and second directions perpendicular to each other, generation of the uneven thrust force of the one or more linear motors caused by the unbalanced resistance involved with the movement of the wiring ducts in both the first and second directions can be significantly reduced or prevented.

In this case, the pair of second wiring ducts preferably extends from the second support to a first side and a second side in the second direction, respectively, and has lengths substantially equal to each other. According to this structure, the second wiring ducts on the first side and the second side in the second direction can be easily symmetrical or substantially symmetrical to each other. Furthermore, the lengths of the pair of second wiring ducts are substantially equalized, whereby the resistance due to the pair of second wiring ducts, which is to be generated when the second support is moved, can be more accurately uniformized on the first side and the second side in the second direction.

In the aforementioned structure including the pair of second wiring ducts, the pair of second wiring ducts preferably has a folded structure in which the same extends to a first side and a second side in the second direction, respectively, and thereafter is folded back over in the planar view and extends to a central portion of the second support, a first end of each of the pair of second wiring ducts is preferably connected to a vicinity of the central portion of the second support in the planar view, and a second end of each of the pair of second wiring ducts is preferably fixed to a position below the first end in a vicinity of a central portion of the second translational mechanism in the planar view. According to this structure, when the second support is located at the center of the second translational mechanism, the first end and the second end of each of the pair of second wiring ducts can be arranged near the central portion of the second support immediately below the movable body. Consequently, the path lengths of the wires or the like to be wired from on the second support to the movable body can be reduced as much as possible, and hence the acceleration and deceleration performance can be improved by reducing the weight of members placed on the second translational mechanism while the complication of the apparatus structure (wiring structure) can be significantly reduced or prevented.

In the aforementioned driving simulation test apparatus, the pair of first wiring ducts preferably includes pairs of first wiring ducts, and when the first support is located at the center of the first translational mechanism in the planar view, the pairs of first wiring ducts are preferably arranged symmetrically or substantially symmetrically not only in the first direction but also in the second direction with respect to a central portion of the first support. According to this structure, even when a plurality of sets (pairs) of first wiring ducts are provided, the resistance due to the pairs of first wiring ducts, which is to be generated when the first support is moved, can be uniformized on the first side and the second side in the first direction. Furthermore, positions on which the resistance due to the first wiring ducts acts are symmetrical or substantially symmetrical in the second direction, and hence bending moment that acts on the first support due to the resistance can be balanced. Consequently, the asymmetrical deformation of the first support that becomes a factor for the uneven thrust force of the one or more linear motors can be significantly reduced or prevented.

In the aforementioned driving simulation test apparatus, the first translational mechanism preferably includes a second base that extends along the first direction at a central portion of the first translational mechanism in the second direction, and a pair of first translational guide portions provided on the second base, and the pair of first wiring ducts preferably extends along the first direction between the pair of first translational guide portions on the second base. According to this structure, a frictional resistance following the guiding of the first support in the first direction can be effectively reduced by the pair of first translational guide portions. Furthermore, the second base that serves as a portion on which the pair of first translational guide portions is placed can also serve as a portion on which the pair of first wiring ducts is placed, and hence the complication of the apparatus structure can be significantly reduced or prevented as compared with the case where the second base for the first translational guide portions and a base for the first wiring ducts are separately provided.

In the aforementioned driving simulation test apparatus, the one or more linear motors of the first translational mechanism are preferably arranged on each of a first side and a second side in the second direction with respect to a central portion of the first translational mechanism in the second direction, the pair of first wiring ducts is preferably provided near both ends of the first support in the second direction and at a central portion of the first support in the second direction, the pair of first wiring ducts near both the ends of the first support preferably houses wires to movable elements of the one or more linear motors of the first translational mechanism, and the pair of first wiring ducts at the central portion of the first support preferably houses wires to the movable body. According to this structure, the first wiring ducts at the central portion of the first support located immediately below the movable body house the wires to the movable body, whereby the path lengths of the wires to the movable body can be reduced as much as possible. Furthermore, power wires to movable elements, which are likely to be thick and heavy in order to supply a large amount of electric power as compared with the wires to the movable body, can be distributed to the first wiring ducts on the first side and the second side in the second direction, and hence the weights of the first wiring ducts can be balanced. Consequently, the resistance of each set (pair) of first wiring ducts can be uniformized, and hence generation of the uneven thrust force of the one or more linear motors can be more effectively significantly reduced or prevented.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

An embodiment of the present invention is hereinafter described with reference to the drawings.

A driving simulation test apparatus 100 according to the embodiment is now described with reference to FIGS. 1 to 10.

(Outline of Driving Simulation Test Apparatus)

Figure 1:
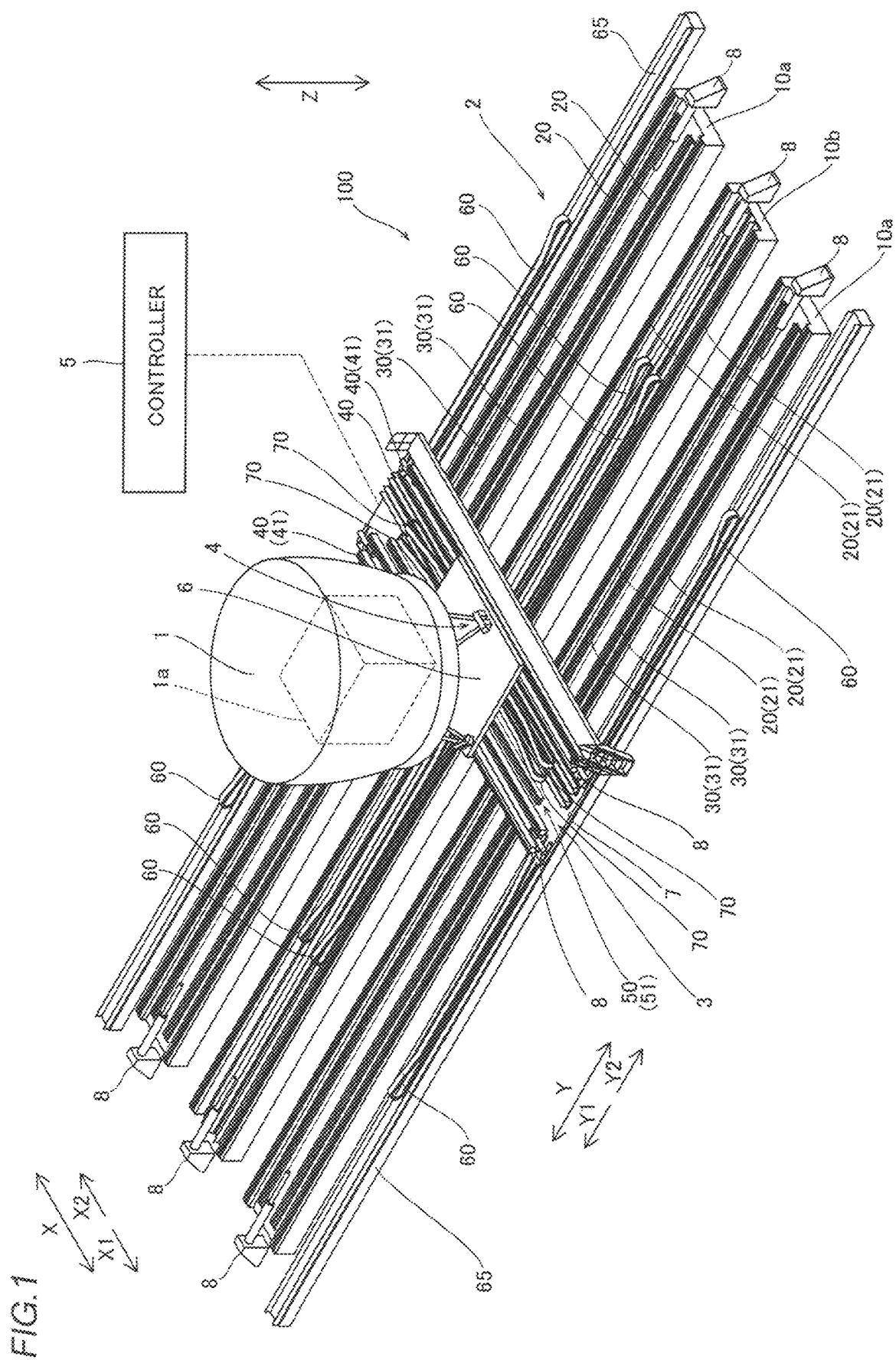
FIG. 1 is a perspective view schematically showing the overall structure of a driving simulation test apparatus according to an embodiment.

As shown in FIG. 1, the driving simulation test apparatus 100 according to this embodiment is an apparatus (so-called driving simulator) that includes a simulated vehicle on which a user can ride and simulates the running of the vehicle according to a driving operation of the user in the simulated vehicle.

The driving simulation test apparatus 100 according to this embodiment can simulate an acceleration to be generated during driving by moving a dome 1 that houses a simulated vehicle 1a on which a user can ride. As described later, the driving simulation test apparatus 100 can move the simulated vehicle 1a in a total of six axial directions including three axial directions (directions Z, X, and Y) in an orthogonal coordinate system set in the simulated vehicle 1a and rotational directions (yaw, pitch, and roll directions) about three axes. The directions X and Y are two directions perpendicular to each other in a horizontal plane, and the direction Z is a vertical direction perpendicular to the directions X and Y. The yaw, pitch, and roll directions are rotational directions about a Z-axis, an X-axis, and a Y-axis, respectively. The directions Y and X are examples of the "first direction" and the "second direction" in the claims, respectively.

Figure 2:
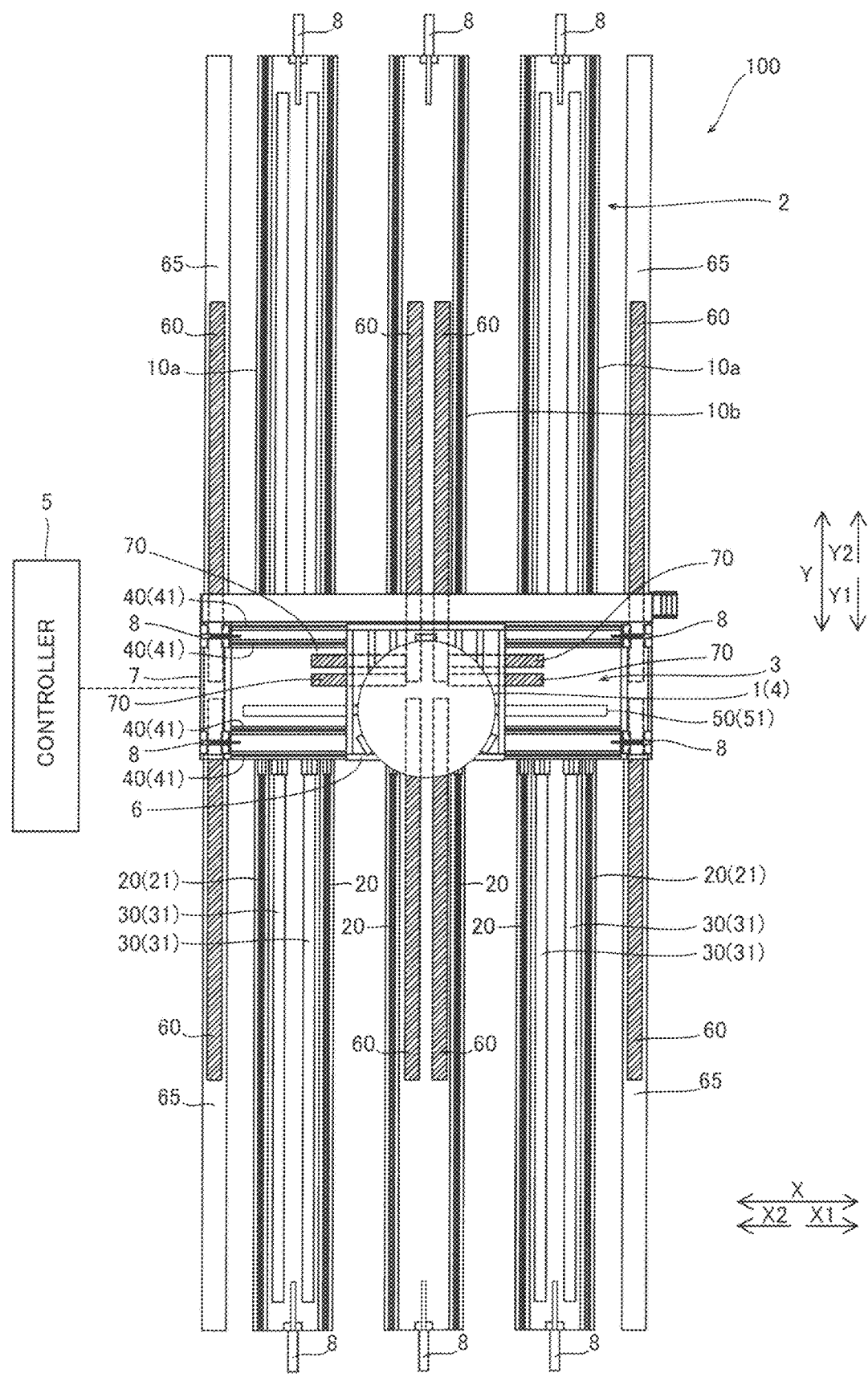
FIG. 2 is a plan view schematically showing the overall structure of the driving simulation test apparatus according to the embodiment.

As shown in FIGS. 1 and 2, the driving simulation test apparatus 100 includes the dome 1 including the simulated vehicle 1a and a Y-axis translational mechanism 2 to move the dome 1 in the direction Y. The driving simulation test apparatus 100 also includes an X-axis translational mechanism 3 to move the dome 1 in the direction X. The dome 1 is an example of the "movable body" in the claims. The Y-axis translational mechanism 2 is an example of the "first translational mechanism" in the claims. The X-axis translational mechanism 3 is an example of the "second translational mechanism" in the claims.

The driving simulation test apparatus 100 also includes a hexapod mechanism (swing mechanism) 4 that supports the dome 1 such that the dome 1 is swingably driven. The driving simulation test apparatus 100 has a structure in which the Y-axis translational mechanism 2, the X-axis translational mechanism 3, the hexapod mechanism 4, and the dome 1 are stacked in this order from the bottom. The driving simulation test apparatus 100 moves, in the six axial directions, the dome 1 that houses the simulated vehicle 1a by combining the movements of these Y-axis translational mechanism 2, X-axis translational mechanism 3, and hexapod mechanism 4. The driving simulation test apparatus 100 also includes a controller 5 to control driving simulation. The controller 5 controls the movements of the Y-axis translational mechanism 2, the X-axis translational mechanism 3, and the hexapod mechanism 4. The controller 5 is placed outside the Y-axis translational mechanism 2. The controller 5 is connected to the respective Y-axis translational mechanism 2, X-axis translational mechanism 3, hexapod mechanism 4, and dome 1 by various wires.

The dome 1 has a box-shaped structure that can internally house the simulated vehicle 1a. The dome 1 includes a display device and a speaker placed around the simulated vehicle 1a. The simulated vehicle 1a is produced similarly to an actual vehicle in order to allow a person to ride on and drive the vehicle. The controller 5 can display a simulation image and output simulation sound according to a driving operation of the user in the dome 1.

The hexapod mechanism 4 is a parallel link mechanism configured by combining a plurality of (three pairs of, i.e., six, for example) links that are extensible and contractible independently of each other by a hydraulic cylinder or an electric actuator, for example. The hexapod mechanism 4 can make the dome 1 perform translational movement in the six axial directions and swing (incline) the same by control of the extension and contraction amount of each of the links performed by the controller 5. The hexapod mechanism 4 is placed on an X-saddle 6.

The X-saddle 6 is a support that supports the dome 1 and the hexapod mechanism 4 on a Y-saddle 7. The X-saddle 6 has a net-like framework structure configured by combining steel materials such as shape steel and steel pipes. Due to this net-like framework structure, the X-saddle 6 is reduced in weight. The figures illustrate the X-saddle 6 as a flat plate for simplification. The X-saddle 6 has a substantially rectangular flat plate-like outer shape as a whole. The X-saddle 6 has a size of about 3 m to about 7 m (X-dimension)×about 2 m to about 4 m (Y-dimension), for example. The Y-saddle 7 is an example of the "first support" in the claims, and the X-saddle 6 is an example of the "second support" in the claims.

The X-axis translational mechanism 3 moves the X-saddle 6 (the dome 1 and the hexapod mechanism 4) in the direction X according to the drive control of the controller 5. The X-axis translational mechanism 3 is placed on the Y-saddle 7 that extends in the direction X. According to this embodiment, the X-axis translational mechanism 3 is configured by combining linear movement guides 41 and a linear motor 51, as described later. The Y-saddle 7 is an example of the "support" in the claims.

The Y-saddle 7 is a support that supports the dome 1, the hexapod mechanism 4, and the X-axis translational mechanism 3. The Y-saddle 7 has a net-like framework structure configured by combining steel materials such as shape steel and steel pipes. Due to this net-like framework structure, the Y-saddle 7 is reduced in weight. The figures illustrate the Y-saddle 7 as a flat plate for simplification. The Y-saddle 7 has a rectangular flat plate-like shape that extends in the direction X as a whole across a plurality of bases (first bases 10a and a second base 10b), described later, of the Y-axis translational mechanism 2. The Y-saddle 7 has a size of about 10 m to about 15 m (X-dimension)×about 3 m to about 7 m (Y-dimension), for example.

The Y-axis translational mechanism 2 is provided below the Y-saddle 7, and makes the Y-saddle 7 perform translational movement in the direction Y. The Y-axis translational mechanism 2 moves the Y-saddle 7 (dome 1) in the direction Y according to the drive control of the controller 5. According to this embodiment, the Y-axis translational mechanism 2 is configured by combining linear movement guides 21 and linear motors 31, as described later. The linear motors 31 are examples of the "coreless linear motor" in the claims.

Thus, the driving simulation test apparatus 100 includes the X-saddle 6 and the Y-saddle 7. The Y-saddle 7 is moved in the direction Y by the Y-axis translational mechanism 2, and the X-saddle 6 is moved in the direction X by the X-axis translational mechanism 3 on the Y-saddle 7. Therefore, the dome 1 is supported by the Y-axis translational mechanism 2 and the Y-saddle 7 to be movable in the direction Y. The dome 1 is supported by the X-axis translational mechanism 3 and the X-saddle 6 to be movable in the direction X.

The driving simulation test apparatus 100 includes a pair of first wiring ducts 60 that extends in the direction Y and is connected to the Y-saddle 7 to be moved in the direction Y following the translational movement of the Y-saddle 7 in the direction Y. The pair of first wiring ducts 60 is arranged below the Y-saddle 7. The "pair of first wiring ducts 60" denotes a pair of a first wiring duct 60 on a Y1 side and a first wiring duct 60 on a Y2 side that extends from the Y-saddle 7 in opposite directions to each other. According to this embodiment, four sets (pairs) of first wiring ducts 60 are provided in total. The driving simulation test apparatus 100 includes a pair of second wiring ducts 70 connected to the Y-saddle 7 and the X-saddle 6. The pair of second wiring ducts 70 extends in the direction X between the Y-saddle 7 and the X-saddle 6. The "pair of second wiring ducts 70" denotes a pair of a second wiring duct 70 on an X1 side and a second wiring duct 70 on an X2 side that extends from the X-saddle 6 in opposite directions to each other. Two sets (two pairs) of second wiring ducts 70 are provided in total. The pair of second wiring ducts 70 is moved in the direction X following the translational movement of the X-saddle 6 in the direction X on the Y-saddle 7.

Each of the wiring ducts (the first wiring ducts 60 and the second wiring ducts 70) is a pipe-like member having a structure (hollow Caterpillar (registered trademark) structure) obtained by connecting a number of frame-shaped (tubular) members in a long axis direction to be bendable at connections. In the respective wiring ducts, various wiring members such as wires (power wires, signal wires) to the linear motors 31, wires to the linear motor 51, and wires and hoses to the hexapod mechanism 4 and the dome 1 are arranged. The wires are not restricted to electric wires (signal wires, power wires, or the like), but may be wires (optical fibers, air hoses, hydraulic pressure hoses to hydraulically drive the hexapod mechanism 4, or the like) to supply light, gas, liquid, or the like).

In a structural example of this embodiment, the Y-axis translational mechanism 2 is one of the two translational mechanisms, which moves along a longer axis, and the working range (stroke amount) thereof in the direction Y is about 25 m to about 35 m including a preliminary stroke for emergency stop. The Y-axis translational mechanism 2 can generate an acceleration of at least about 10 m/s$^2$ (about 1 G) in the direction Y. The X-axis translational mechanism 3 is the other of the two translational mechanisms, which moves along a shorter axis, and the stroke amount thereof in the direction X is about 5 m to about 10 m including a preliminary stroke for emergency stop. The X-axis translational mechanism 3 can generate an acceleration of at least about 3 m/s$^2$ in the direction X.

As shown in FIG. 2, a plurality of damper mechanisms 8 for emergency stop are provided on both ends of the working range of the Y-axis translational mechanism 2 in the direction Y and both ends of the working range of the X-axis translational mechanism 3 in the direction X. The damper mechanisms 8 come into contact with the X-saddle 6 or the Y-saddle 7 that has gone beyond a preliminary stroke region to stop the X-saddle 6 or the Y-saddle 7 while applying a braking force thereto.

(Structure of Y-Axis Translational Mechanism)

The structure of the Y-axis translational mechanism 2 is now described in detail.

According to this embodiment, the driving simulation test apparatus 100 includes the two first bases 10a and the single second base 10b that extend along the direction Y, translational guide portions 20 that serve as guides when making the dome 1 perform translational movement, and translational drive portions 30 that make the dome 1 perform translational movement in the direction Y. The Y-axis translational mechanism 2 to move the dome 1 in the direction Y includes the two first bases 10a and the single second base 10b, the translational drive portions 30 and the translational guide portions 20 placed on the first bases 10a, and the translational guide portions 20 placed on the second base 10b. The translational guide portions 20 and the translational drive portions 30 are examples of the "first translational guide portion" and the "first translational drive portion" in the claims, respectively.

According to this embodiment, each of the translational drive portions 30 includes a plurality of (four) linear motors 31 (see FIG. 4) that extends along the direction Y. Each of the translational guide portions 20 includes a plurality of (two) linear movement guides 21 (see FIG. 4) that extends along the direction Y. According to this embodiment, on each of the two first bases 10a, a plurality of (two) translational drive portions 30 and a plurality of (two) translational guide portions 20 are aligned in the direction X.

<Bases>

Figure 3:
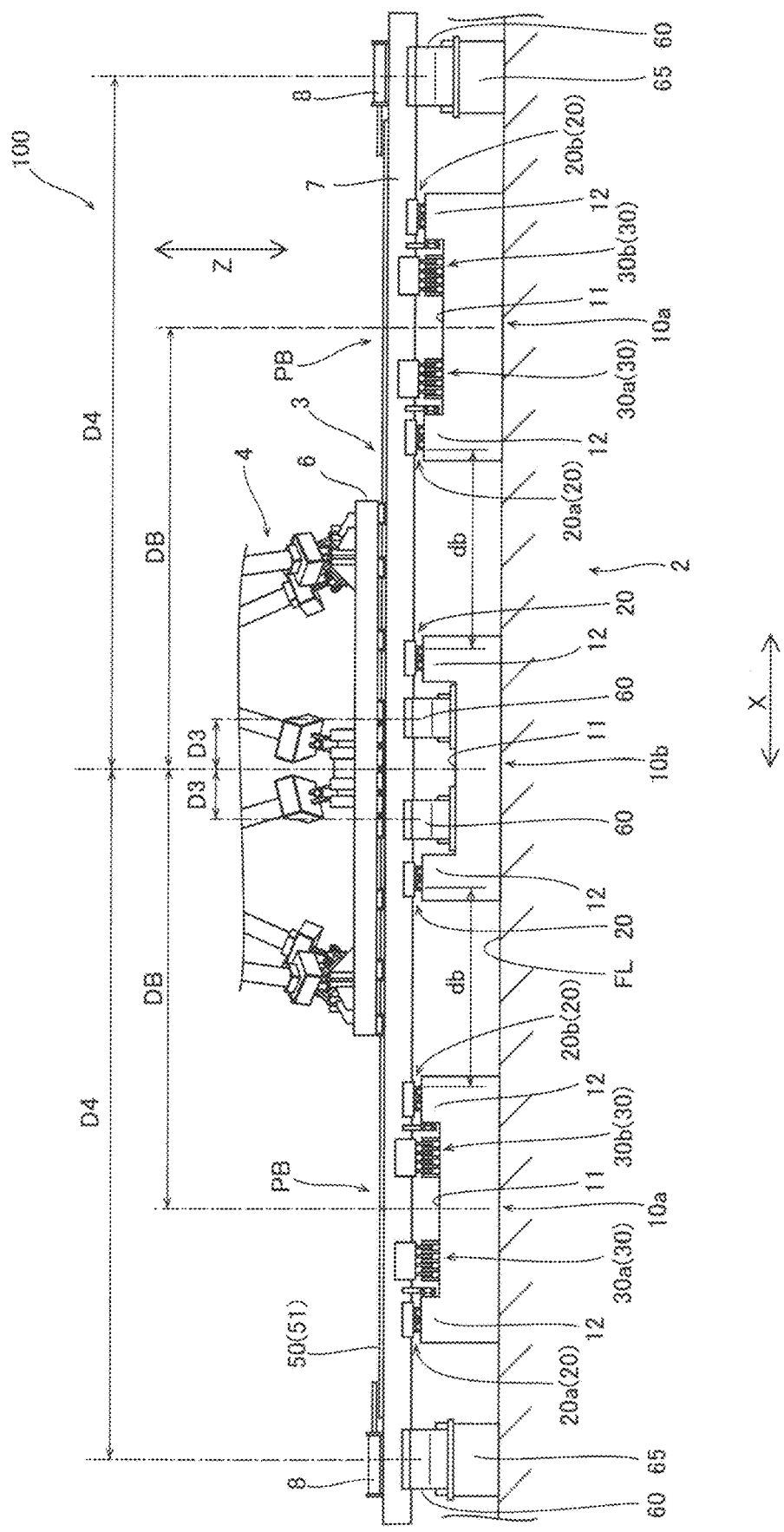
FIG. 3 is a schematic view of a Y-axis translational mechanism as viewed in a direction Y.

As shown in FIGS. 2 and 3, the two first bases 10a and the single second base 10b of the Y-axis translational mechanism 2 extend along the direction Y, and are spaced from each other in the direction X in a planar view. The first bases 10a and the second base 10b are linear in the direction Y. The first bases 10a and the second base 10b each have a rectangular shape in the planar view. The first bases 10a and the second base 10b each are made of a metal material (such as cast iron or a steel material). The first bases 10a and the second base 10b each are divided in the direction Y in units of several meters, for example, and the divided portions are coupled to each other along the direction Y such that the first bases 10a and the second base 10b are configured as long bases. The first bases 10a and the second base 10b each have an entire length of about 40 m to about 50 m in the direction Y, for example. On both ends of each of the first bases 10a and the second base 10b in the direction Y, the damper mechanisms 8 are arranged, respectively.

As shown in FIG. 3, the first bases 10a and the second base 10b each include a recess portion 11 recessed in the direction Z (downward direction) at its central portion in the direction X. The first bases 10a and the second base 10b each have a shape in which wall portions 12 on both sides of the recess portion 11 in the direction X protrude upward with respect to the bottom surface of the recess portion 11. The recess portion 11 and the wall portions 12 on both sides extend in the direction Y over the entire length of the first bases 10a (second base 10b). The bottom surface (upper surface) of the recess portion 11 and the upper surfaces of the wall portions 12 are flattened. The wall portions 12 on both sides in the direction X of each of the first bases 10a (second base 10b) are configured as portions on which the translational guide portions 20 are placed. The recess portion 11 at the center in the direction X is configured as a portion on which the translational drive portions 30 are placed.

Thus, FIG. 3 shows an example in which a total of three bases (the first bases 10a and the second base 10b) is provided. The three first bases 10a and second base 10b in total are arranged at equal intervals (center intervals) DB in the direction X.

A pair of (two) first bases 10a is arranged symmetrically or substantially symmetrically in the direction X with respect to the center of the Y-saddle 7 in the direction X in the planar view. Two or three first bases 10a are preferably aligned at intervals in the direction X, and according to this embodiment, two first bases 10a are provided. The pair of (two) first bases 10a is arranged at the intervals DB from the center of the Y-saddle 7 in the direction X. On the first bases 10a, the plurality of translational drive portions 30 and the plurality of translational guide portions 20 are aligned in the direction X.

According to this embodiment, the pair of (two) first bases 10a is arranged at positions that correspond to the Bessel points PB of the Y-saddle 7 in the direction X or regions around the Bessel points PB (their vicinities), respectively. The Y-saddle 7 has a rectangular shape that linearly extends in the direction X in the planar view (see FIG. 2). The Y-saddle 7 is provided across the pair of first bases 10a, as viewed in the direction Y (see FIG. 3). Assuming that the Y-saddle is a beam having a weight evenly distributed and being subjected to an equal load and the beam is supported at two points, the Bessel points PB of the Y-saddle 7 are defined as support positions at which the influence of deflation on the entire beam from one end to the other end is minimized. Specifically, the Bessel points PB of the Y-saddle 7 are positions at which a distance between two support points subjected to an equal load is about 55% of the length of the Y-saddle 7 in the direction X. According to this embodiment, the pair of first bases 10a supports the Y-saddle 7 at three positions (three points) in combination with the second base 10b, and hence the pair of first bases 10a is arranged at the positions near the Bessel points PB at which the deflection of the Y-saddle 7 is minimized by three-point support. In the first bases 10a, ranges between the translational guide portions 20 on both sides in the direction X are considered as support points (support points each having a width in the direction X), and it is only required to arrange these support points at the Bessel points PB or the regions around the Bessel points PB (their vicinities). For stable support, the Bessel points PB are preferably located between the translational guide portions 20 on both sides of the first bases 10a in the direction X. In other words, the first bases 10a are preferably arranged such that pairs of translational guide portions 20 (linear movement guides 21) of the first bases 10a are arranged on both sides in the direction X through the Bessel points PB.

According to this embodiment, the single second base 10b is arranged at a position that passes through the center or near the center (the vicinity of the center) of the Y-saddle 7 in the direction X. The second base 10b supports the Y-saddle 7 at the center or near the center of the Y-saddle 7 in the direction X. Therefore, in the entire Y-axis translational mechanism 2, the three bases (the first bases 10a and the second base 10b) support the Y-saddle 7 at the three positions, which are at the center or near the center of the Y-saddle 7 in the direction X and at the two Bessel points PB in the direction X or the regions around the Bessel points PB. On the second base 10b, no translational drive portion 30 is provided, but the translational guide portions 20 are provided.

<Translational Guide Portions>

The translational guide portions 20 are placed on the first bases 10a and the second base 10b and support the Y-saddle 7 such that the Y-saddle 7 is movable in the direction Y. The translational guide portions 20 constrain the movement of the Y-saddle 7 in the direction X and the direction Z.

Figure 4:
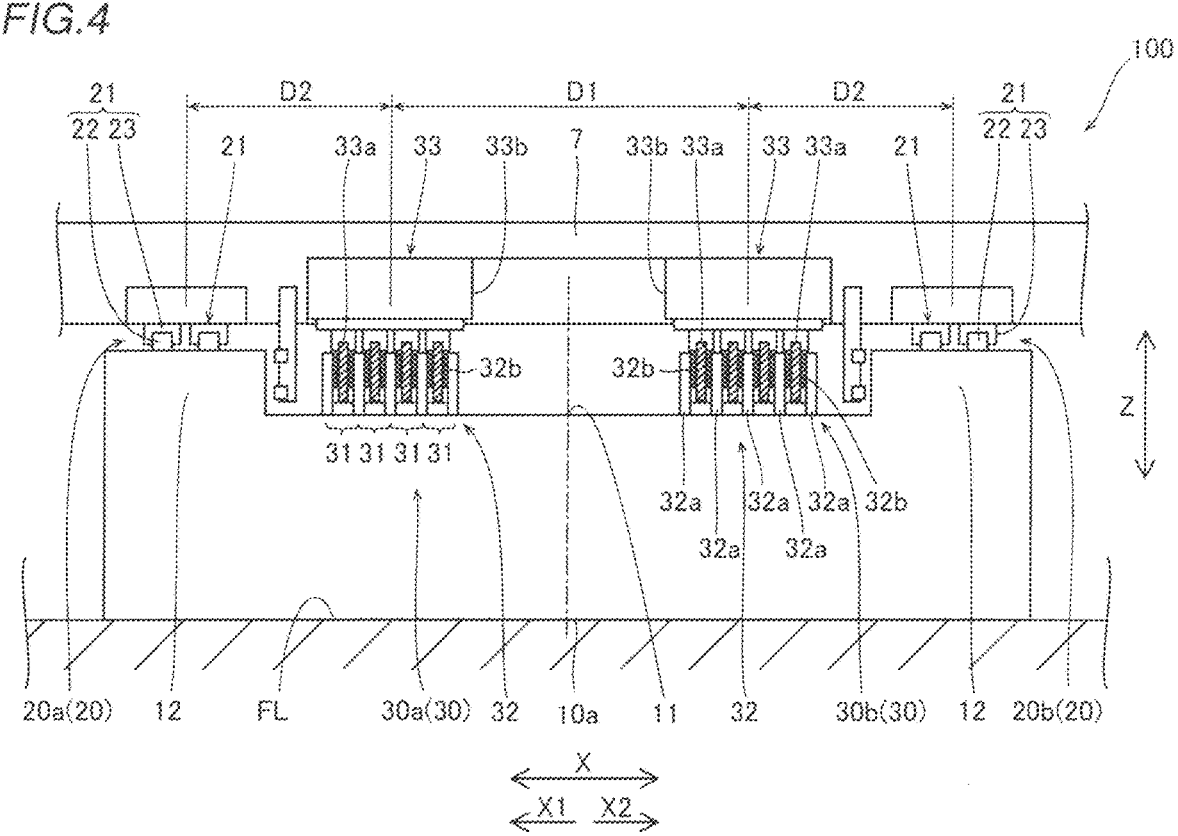
FIG. 4 is a schematic view of a first base as viewed in the direction Y.
Figure 5:
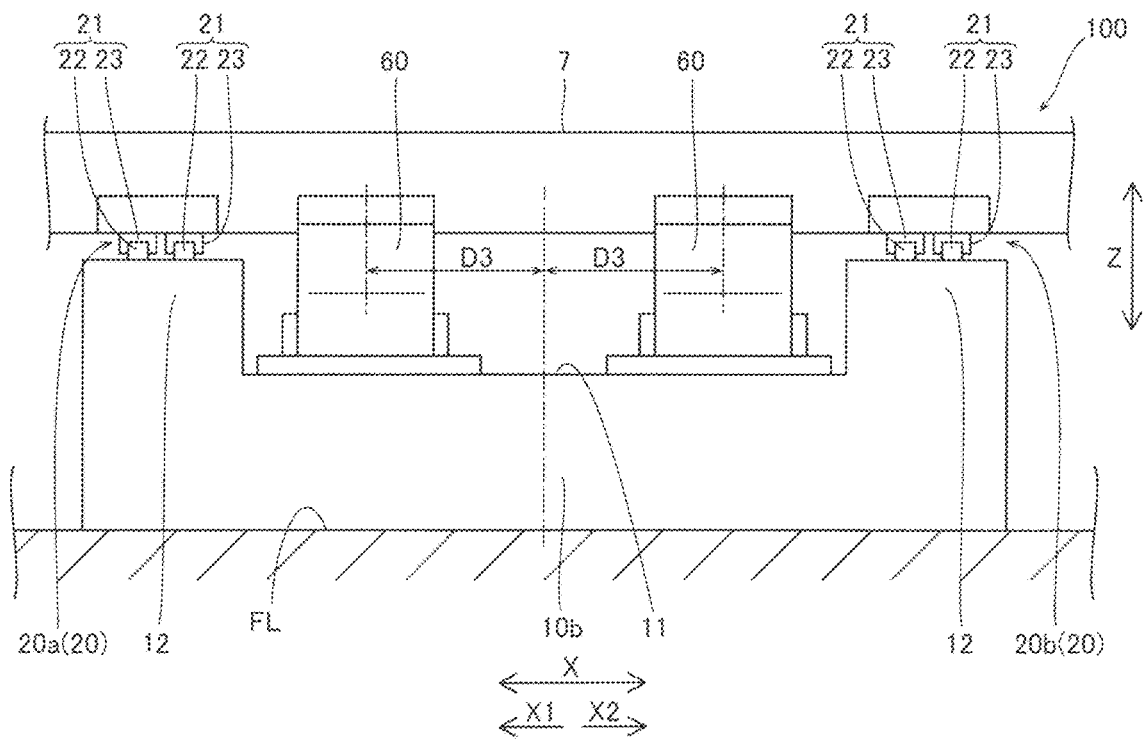
FIG. 5 is a schematic view of a second base as viewed in the direction Y.

As shown in FIGS. 4 and 5, according to this embodiment, a pair of translational guide portions 20 is arranged near both ends of each of the first bases 10a (second base 10b) in the direction X. More specifically, the translational guide portions 20 are placed on the upper surfaces of the wall portions 12 on both sides of each of the first bases 10a (second base 10b) in the direction X, respectively. Therefore, each of the two first bases 10a supports the Y-saddle 7 at two points by the wall portions 12 on both sides with respect to each of the positions (the centers of the first bases 10a) that correspond to the Bessel points PB of the Y-saddle 7 or the regions (see FIG. 3) around the Bessel points PB when viewed in an X-Z cross-section. Similarly, the second base 10b supports the Y-saddle 7 at two points by the wall portions 12 on both sides with respect to a position (the center of the second base 10b) that corresponds to a central portion of the Y-saddle 7 in the direction X when viewed in an X-Z cross-section.

The pair of translational guide portions 20 is arranged symmetrically with respect to a central position of each of the first bases 10a (second base 10b) in the direction X. The pair of translational guide portions 20 is placed at the same height on the upper surfaces of the wall portions 12 of each of the first bases 10a (second base 10b).

In examples shown in FIGS. 4 and 5, each of the translational guide portions 20 includes the two linear movement guides 21, and hence two pairs of (four) linear movement guides 21 are provided on each of the bases (the first bases 10a and the second base 10b). In the entire Y-axis translational mechanism 2 (see FIG. 3), the two linear movement guides 21 are provided at six positions on the three bases (the first bases 10a and the second base 10b). More specifically, a total of twelve linear movement guides 21 are provided.

The linear movement guides 21 extend along the direction Y on the bases (the first bases 10a and the second base 10b) and support the Y-saddle 7 such that the Y-saddle 7 is movable in the direction Y. The linear movement guides 21 include guide rails 22 that linearly extend and slide blocks 23 that engage with the guide rails 22. Rolling elements (not shown) such as balls or rollers are housed in inner surface portions of the slide blocks 23 closer to the guide rails 22. The linear movement guides 21 can move the slide block 23 at a low resistance and precisely along the guide rails 22 by the rolling of the rolling elements.

Figure 9:
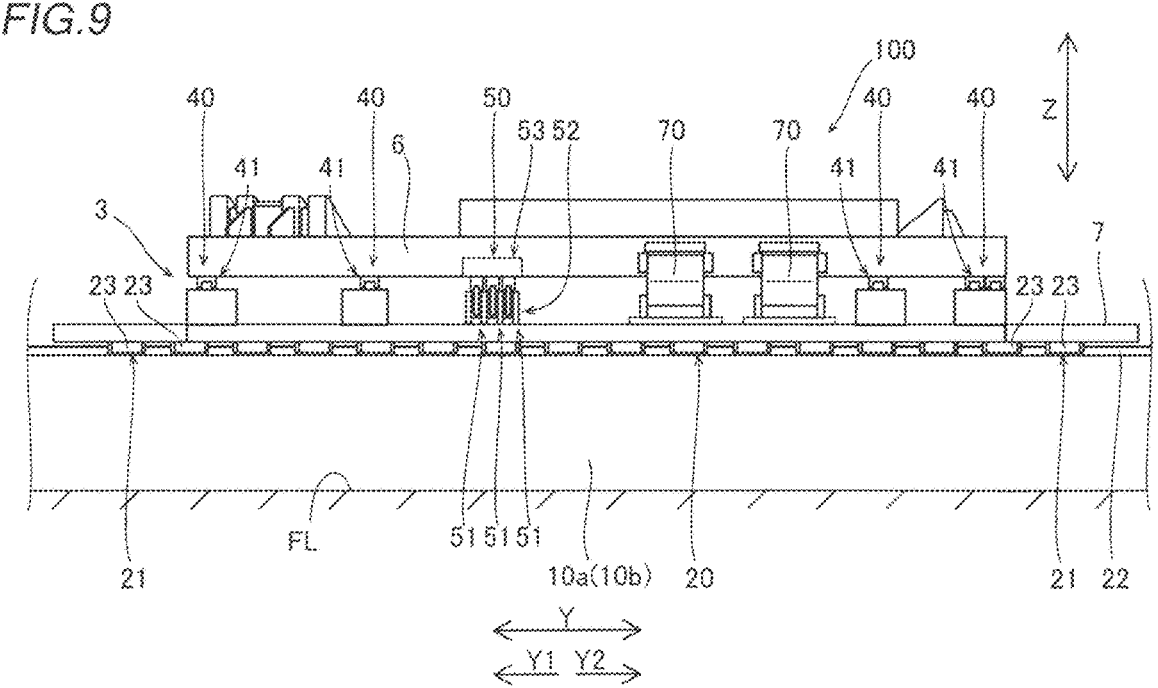
FIG. 9 is a schematic view of an X-axis translational mechanism as viewed in a direction X.

The guide rails 22 are fixed onto the upper surfaces of the wall portions 12 of each of the bases (the first bases 10a and the second base 10b). The slide blocks 23 are fixed onto the lower surface of the Y-saddle 7. A plurality of slide blocks 23 are arranged on one guide rail 22. In FIG. 9, for example, sixteen slide blocks 23 are arranged on one guide rail 22 to be distributed over the entire length of the Y-saddle 7 in the direction Y.

<Translational Drive Portions>

As shown in FIG. 4, the translational drive portions 30 are placed on the recess portions 11 of the two first bases 10a. On each of the first bases 10a, a pair of translational drive portions 30 is arranged between the pair of translational guide portions 20. The translational drive portions 30 linearly extend in the direction Y over both ends of each of the first bases 10a (see FIG. 2), and can apply a thrust force in the direction Y to the Y-saddle 7. The pair of translational drive portions 30 is arranged at a position of each of the first bases 10a between the pair of translational guide portions 20. Thus, in the entire Y-axis translational mechanism 2 (see FIG. 3), the translational drive portions 30 are provided at a total of four positions on the two first bases 10a. As shown in FIG. 3, the linear motors 31 (translational drive portions 30) of the Y-axis translational mechanism 2 are arranged on a first side (X1 side) and a second side (X2 side) in the direction X with respect to a central portion of the Y-axis translational mechanism 2.

According to this embodiment, as shown in FIG. 4, the pair of translational drive portions 30 of each of the first bases 10a is arranged such that each of second distances D2 between the translational drive portions 30 and the translational guide portions 20 adjacent to the translational drive portions 30 is smaller than a first distance D1 between the pair of translational drive portions 30. More specifically, a translational drive portion 30a on the first side (X1 side) of the pair of translational drive portions 30 is arranged adjacent to a translational guide portion 20a on the first side near the translational guide portion 20a on the same first side. A translational drive portion 30b on the second side (X2 side) of the pair of translational drive portions 30 is arranged adjacent to a translational guide portion 20b on the second side near the translational guide portion 20b on the same second side. Consequently, each of the second distances D2 between the translational drive portions 30 and the translational guide portions 20 adjacent to each other is smaller than the first distance D1 between the translational drive portions 30 when distances between central positions are compared with each other, for example.

The pair of the translational drive portions 30 is arranged symmetrically with respect to the central position of each of the first bases 10a in the direction X. Therefore, a second distance D2 between the translational guide portion 20a on the first side (X1 side) and the translational drive portion 30a is equal to a second distance D2 between the translational drive portion 30b on the second side (X2 side) and the translational guide portion 20b. The pair of translational drive portions 30 is placed at the same height on the upper surface of the recess portion 11 of each of the first bases 10a.

According to this embodiment, the translational drive portions 30 each include the plurality of linear motors 31, which is integrated. In the example shown in FIG. 4, the four linear motors 31 of each of the translational drive portions 30 are integrated. The integration denotes a structure in which movable elements and stators of the plurality of linear motors 31 are integrally assembled on corresponding common structures (a movable element unit, a stator unit).

In the structural example shown in FIG. 4, the translational drive portions 30 include stator units 32 obtained by integrating the stators of the plurality of linear motors 31 and movable element units 33 obtained by integrating the movable elements of the plurality of linear motors 31. The stator units 32 are placed on each of the first bases 10a, and the movable element units 33 are placed on the lower surface of the Y-saddle 7.

In each of the stator units 32, a U-shaped cross-sectional support including a pair of support walls 32a that is upright and extends along the direction Y and permanent magnets 32b placed on the inner surfaces (facing surfaces) of the pair of support walls 32a are regarded as a structural unit (single stator) of each of the linear motors 31. A portion (support walls 32a) of the structural unit is shared, and the four structural units are arrayed in the direction X, whereby each of the stator units 32 has a combtooth-shaped cross-sectional shape due to five support walls 32a. The permanent magnets 32b are provided on the inner surfaces of the support walls 32a that face each other, respectively. The permanent magnets 32b face each other in the direction X at a predetermined interval between the adjacent support walls 32a. A pair of permanent magnets 32b that faces each other is magnetized such that the facing surfaces are different in polarity from each other, and south poles and north poles are alternately aligned along the direction Y.

Each of the movable element units 33 includes four coil portions 33a arranged in four clearances between the permanent magnets 32b of each of the stator units 32, respectively. Every coil portion 33a is a structural unit of each of the linear motors 31. Each of the movable element units 33 includes a support block 33b arranged above each of the stator units 32 to vertically face each of the stator units 32. The support block 33b is fixed onto the lower surface of the Y-saddle 7. The four coil portions 33a extend downward from the lower surface of the support block 33b. Current is supplied to the coil portions 33a arranged in magnetic fields in the direction X generated by pairs of permanent magnets 32b that face each other in the direction X, whereby each of the movable element units 33 generates a thrust force in the direction Y.

According to this embodiment, the linear motors 31 are coreless linear motors. More specifically, no iron-core (core) is provided in the coil portions 33a of the movable element units 33. Thus, in the linear motors 31, no magnetic attractive force is generated between the permanent magnets 32b of the stator units 32 and the coil portions 33a of the movable element units 33.

<First Wiring Ducts>

As shown in FIGS. 1 to 3, according to this embodiment, the driving simulation test apparatus 100 includes the four sets (four pairs) of first wiring ducts 60 in total that extend to a first side (Y1 side) in the direction Y and a second side (Y2 side) in the direction Y with respect to the Y-saddle 7.

The pairs of first wiring ducts 60 are provided near both ends of the Y-saddle 7 in the direction X and at the central portion of the Y-saddle 7 in the direction X. Pairs of first wiring ducts 60 near both ends in the direction X are placed on duct supports 65 arranged on both outer sides in the direction X with respect to the three bases shown in FIG. 3, respectively. Two pairs (two sets) of first wiring ducts 60 at the central portion in the direction X are placed on the central second base 10b.

As shown in FIG. 2, the pairs of first wiring ducts 60 are provided symmetrically or substantially symmetrically in the direction Y with respect to the Y-saddle 7 when the Y-saddle 7 is located at the center of the Y-axis translational mechanism 2 in the planar view. The four pairs of first wiring ducts 60 are arranged symmetrically or substantially symmetrically in the direction X with respect to the central portion of the Y-saddle 7 when the Y-saddle 7 is located at the center of the Y-axis translational mechanism 2 in the planar view. Specifically, as shown in FIG. 3, the two sets of first wiring ducts 60 at the central portion are arranged at distances D3 in the direction X from the center (substantially corresponding to the center of the second base 10b) of the Y-saddle 7, respectively. The two sets of first wiring ducts 60 near both ends are arranged at distances D4 in the direction X from the center of the Y-saddle 7, respectively.

Figure 6:
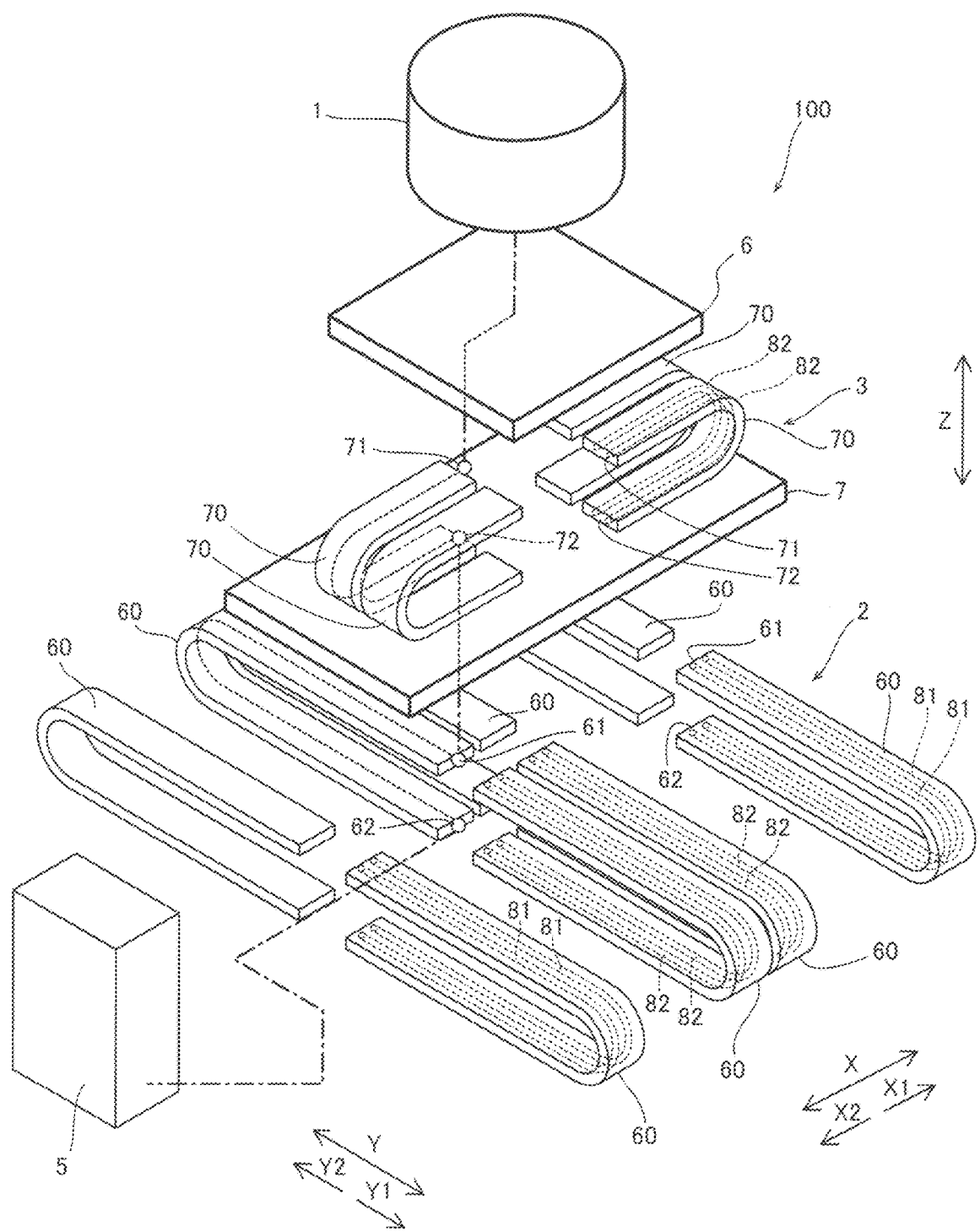
FIG. 6 is an exploded perspective view for illustrating the positional relationship between first wiring ducts and second wiring ducts.

As shown in FIG. 6, each pair of first wiring ducts 60 has a folded structure in which the same extends to the first side (Y1 side) and the second side (Y2 side) in the direction Y, respectively, and thereafter is folded back over in the planar view and extends to the central portion of the Y-saddle 7.

Figure 7:
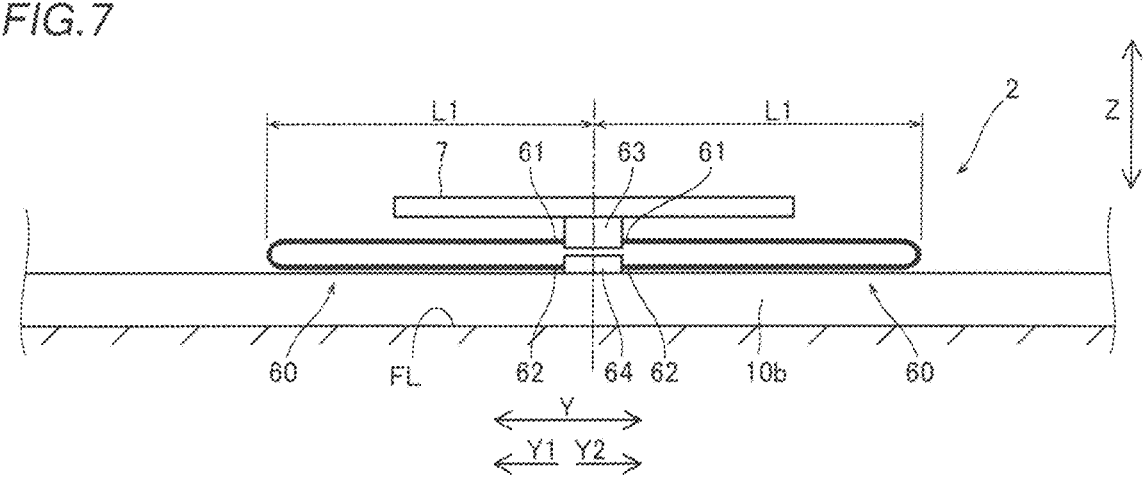
FIG. 7 is a schematic view showing the arrangement of a pair of first wiring ducts in the case where a Y-saddle is located at the center of the Y-axis translational mechanism.

First ends 61 of each pair of first wiring ducts 60 are arranged near the central portion of the Y-saddle 7 in the planar view. As shown in FIG. 7, for example, the first ends 61 of the first wiring ducts 60 are connected to a terminal box 63 provided on the lower surface of the Y-saddle 7.

Second ends 62 of each pair of first wiring ducts 60 are fixed to positions below the first ends 61 in the vicinity of the central portion of the Y-axis translational mechanism 2 in the planar view. For example, the second ends 62 of the first wiring ducts 60 are fixed onto a placement surface FL of the Y-axis translational mechanism 2 or are fixedly connected to a terminal box 64 placed on the second base 10b (on the duct supports 65).

Figure 8:
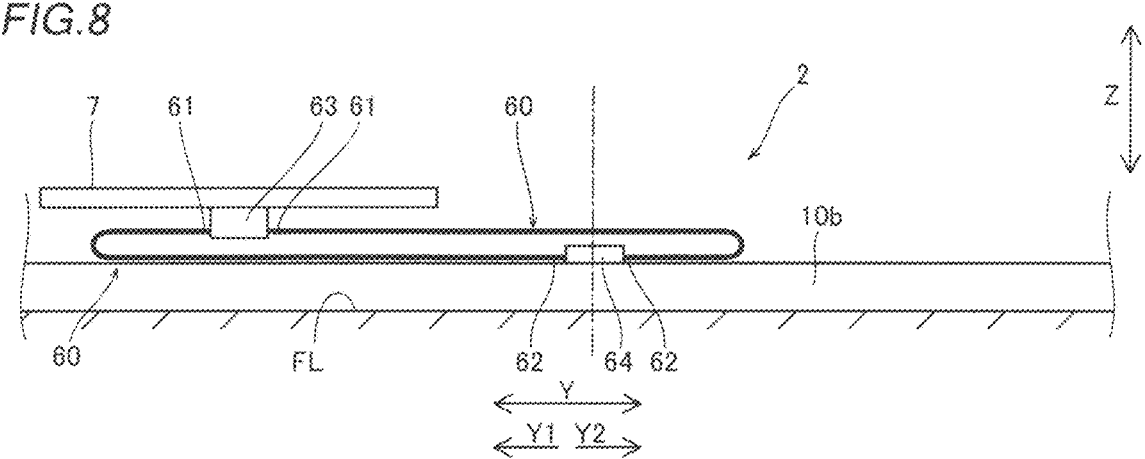
FIG. 8 is a schematic view showing a state where the Y-saddle has been moved in FIG. 7.

Consequently, as shown in FIG. 8, the first ends 61 of the first wiring ducts 60 serve as a movable side while the second ends 62 of the first wiring ducts 60 serve as a fixed side. The fixed side (second ends 62) is laid along the recess portion 11 (duct supports 65), bent portions are formed, and then the movable side (first ends 61) is connected to the Y-saddle 7. Thus, as a result of the movement of the Y-saddle 7, the first wiring ducts 60 follow the movement of the Y-saddle 7 such that portions in which the bent portions are formed are changed.

The terminal box 63 connects a terminal box 74 (see FIG. 10) on the Y-saddle 7 to wires housed in the first wiring ducts 60, for example. The terminal box 64 connects a wire that connects the controller 5 to the terminal box 64 to the wires housed in the first wiring ducts 60, for example.

According to this embodiment, each pair of first wiring ducts 60 extends from the Y-saddle 7 to the Y1 side and the Y2 side, respectively, and has lengths substantially equal to each other. The first wiring ducts 60 are folded back over, and hence the length of each of the first wiring ducts 60 is the sum of the length of an upper overlapping portion and the length of a lower overlapping portion. The length of each of the first wiring ducts 60 is twice a length L1 in the direction Y (2×L1) when both ends of each of the first wiring ducts 60 are aligned as shown in FIG. 7. According to this embodiment, each of the first wiring ducts 60 has a predetermined length of about 20 m to about 30 m, for example.

According to this embodiment, each of the pair of first wiring ducts 60 houses a plurality of wires distributed such that the total weight of one of the pair of first wiring ducts 60 is substantially equal to the total weight of the other of the pair of first wiring ducts 60. Specifically, as shown in FIG. 6, the first wiring ducts 60 near both ends of the Y-saddle 7 house wires 81 to the movable elements (coil portions 33a) of the linear motors 31 of the Y-axis translational mechanism 2. More specifically, a pair of first wiring ducts 60 on the X1 side houses wires 81 for supplying electric power to movable element units 33 that translational drive portions 30 (see FIG. 3) of a first base 10a on the X1 side include. A pair of first wiring ducts 60 on the X2 side houses wires 81 for supplying electric power to movable element units 33 that translational drive portions 30 (see FIG. 3) of a first base 10a on the X2 side include (FIG. 6 shows only wires in the first wiring ducts 60 on the Y1 side). The first wiring ducts 60 at the central portion of the Y-saddle 7 house wires 82 to the dome 1 (the hexapod mechanism 4 and the X-axis translational mechanism 3). Thus, the respective first wiring ducts 60 house the wires distributed according to the connection destinations of the wires such that wiring path lengths to the connection destinations of the wires are minimized (the wires are housed in ducts closest to the connection destination of the wires).

When each pair of the first wiring ducts 60 is considered, the two translational drive portions 30 are placed on each of the first bases 10a on both sides in the direction X, and hence each of the pairs of the first wiring ducts 60 on both sides in the direction X corresponds to one translational drive portion 30. More specifically, each of a first wiring duct 60 on the Y1 side and a first wiring duct 60 on the Y2 side houses the wires 81 to the four linear motors 31 contained in one translational drive portion 30. Consequently, the total weight of the first wiring duct 60 on the Y1 side and the total weight of the first wiring duct 60 on the Y2 side of each of the two sets (two pairs) of first wiring ducts 60 on both sides in the direction X are substantially equal to each other.

The wires 81 to the movable elements (coil portions 33a) are thick and heavy in order to supply a large amount of electric power. On the other hand, each of the wires 82 to the dome 1 is light, but the number of wires 82 is extremely large unlike the wires 81 to the movable elements (coil portions 33a). In the first wiring ducts 60 at the central portion in the direction X that house the wires 82 to the dome 1, the number of wires 82 housed in the first wiring ducts 60 on the Y1 side and the number of wires 82 housed in the first wiring ducts 60 on the Y2 side are substantially equal to each other regardless of the type of wires 82. Consequently, the total weight of the first wiring duct 60 on the Y1 side and the total weight of the first wiring duct 60 on the Y2 side of each of the two sets of first wiring ducts 60 at the center in the direction X are substantially equal to each other.

(Structure of X-Axis Translational Mechanism)

The structure of the X-axis translational mechanism 3 is now described with reference to FIG. 9. The X-axis translational mechanism 3 is similar in basic structure to the Y-axis translational mechanism 2, and hence the structure of the X-axis translational mechanism 3 is briefly described. In FIG. 9, the hexapod mechanism 4 etc. on the X-saddle 6 is omitted.

The driving simulation test apparatus 100 includes one translational drive portion 50 that makes the dome 1 perform translational movement in the direction X and four translational guide portions 40 that serve as guides when the dome 1 performs translational movement in the direction X. The X-axis translational mechanism 3 includes the translational drive portion 50 and the translational guide portions 40. The translational guide portions 40 and the translational drive portion 50 are examples of the "second translational guide portion" and the "second translational drive portion" in the claims, respectively. Unlike the Y-axis translational mechanism 2, no base is provided on the X-axis translational mechanism 3, and the Y-saddle 7 functions as one common base. More specifically, the translational drive portion 50 and the translational guide portions 40 are directly placed on the Y-saddle 7 not through the common base. A plurality of first bases may be provided also in the X-axis translational mechanism 3, and the translational drive portion 50 and the translational guide portions 40 may be concentrated on each of the first bases.

According to this embodiment, the translational drive portion 50 includes three linear motors 51 that extend along the direction X. Each of the translational guide portions 40 includes one or two linear movement guides 41 that extend along the direction X.

The four translational guide portions 40 are provided at intervals in the direction Y. The translational guide portions 40 are placed on the Y-saddle 7, and support the X-saddle 6 such the X-saddle 6 is movable in the direction X. Two translational guide portions 40 are provided on each of the Y1 side and the Y2 side of the Y-saddle 7. In other words, two pairs of translational guide portions 40 are arranged. The translational guide portions 40 constrain the movement of the X-saddle 6 in the direction Y and the direction Z. As shown in FIG. 2, damper mechanisms 8 (omitted in FIG. 9) are arranged on both ends of the two pairs of translational guide portions 40 in the direction X.

The single translational drive portion 50 is placed near the center of the Y-saddle 7 in the direction Y. The translational drive portion 50 linearly extends in the direction X on the Y-saddle 7 (see FIG. 2), and can apply a thrust force in the direction X to the X-saddle 6. The translational drive portion 50 is placed between the two pairs of translational guide portions 40.

In an example shown in FIG. 9, the translational drive portion 50 has a similar structure to the translational drive portions 30, and the integrated three linear motors 51. The translational drive portion 50 includes a stator unit 52 obtained by integrating stators of the three linear motors 51 and a movable element unit 53 obtained by integrating movable elements of the three linear motors 51. The stator unit 52 is placed on the Y-saddle 7, and the movable element unit 53 is placed on the lower surface of the X-saddle 6.

<Second Wiring Ducts>

According to this embodiment, as shown in FIG. 2, the driving simulation test apparatus 100 includes the two sets (two pairs) of second wiring ducts 70, each of which extends to the first side (X1 side) and the second side (X2 side) in the direction X with respect to the X-saddle 6, respectively. The pairs of second wiring ducts 70 are provided near a central portion of the X-saddle 6 in the direction Y. The two sets of second wiring ducts 70 are aligned between the two pairs of translational guide portions 40.

Each pair of second wiring ducts 70 is provided symmetrically or substantially symmetrically in the direction X with respect to the X-saddle 6 when the X-saddle 6 is located at the center of the X-axis translational mechanism 3 in the planar view. When the Y-saddle 7 and the X-saddle 6 are located at the centers of the Y-axis translational mechanism 2 and the X-axis translational mechanism 3, respectively (see FIG. 2), the pair of first wiring ducts 60 and the pair of second wiring ducts 70 are arranged in a cross shape in the planar view. More specifically, in FIG. 2, the two sets (two pairs) of first wiring ducts 60 at the center in the direction X and the two sets (two pairs) of second wiring ducts 70 are arranged in a cross shape in the planar view.

As shown in FIG. 6, each pair of second wiring ducts 70 has a folded structure in which the same extends to the first side (X1 side) and the second side (X2 side) in the direction X, respectively, and thereafter is folded back over in the planar view and extends to the central portion of the X-saddle 6.

Figure 10:
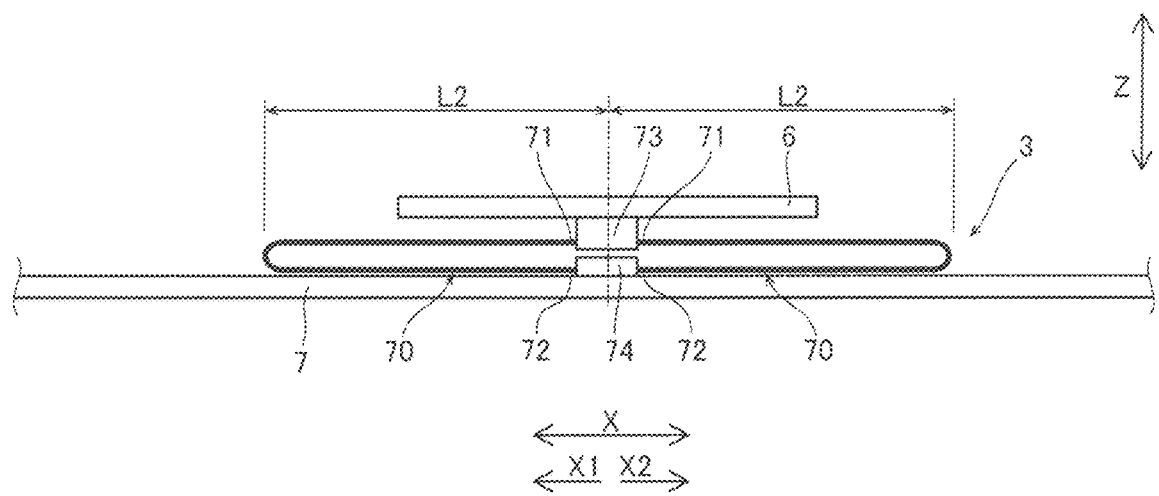
FIG. 10 is a schematic view showing the arrangement of a pair of second wiring ducts in the case where an X-saddle is located at the center of the X-axis translational mechanism.

First ends 71 of each pair of second wiring ducts 70 are connected to the vicinity of the central portion of the X-saddle 6 in the planar view. As shown in FIG. 10, for example, the first ends 71 of the second wiring ducts 70 are connected to a terminal box 73 provided on the lower surface of the X-saddle 6 to be fixed to the X-saddle 6. Second ends 72 of each pair of second wiring ducts 70 are fixed to positions below the first ends 71 in the vicinity of a central portion of the X-axis translational mechanism 3 in the planar view. For example, the second ends 72 of the second wiring ducts 70 are connected to the terminal box 74 placed on the Y-saddle 7.

Consequently, similarly to the first wiring ducts 60 shown in FIG. 8, the first ends 71 of the second wiring ducts 70 serve as a movable side while the second ends 72 of the second wiring ducts 70 serve as a fixed side. The fixed side (second ends 72) is laid along the Y-saddle 7, bent portions are formed, and then the movable side (first ends 71) is connected to the X-saddle 6. Thus, as a result of the movement of the X-saddle 6, the second wiring ducts 70 follow the movement of the X-saddle 6 such that portions in which the bent portions are formed are changed.

The terminal box 73 connects wires to be connected to the dome 1 and the hexapod mechanism 4 on the X-saddle 6 to wires housed in the second wiring ducts 70, for example. The terminal box 74 connects the wires housed in the second wiring ducts 70 to the terminal box 63, for example.

According to this embodiment, each pair of second wiring ducts 70 extends from the X-saddle 6 to the first side and the second side in the direction X, respectively, and has lengths substantially equal to each other. The length of each of the second wiring ducts 70 is twice a length L2 in the direction X (2×L2) when both ends of each of the second wiring ducts 70 are aligned as shown in FIG. 10. According to this embodiment, each of the second wiring ducts 70 has a predetermined length of about 7 m to about 12 m, for example.

According to this embodiment, similarly to the pair of first wiring ducts 60, each of the pair of second wiring ducts 70 houses a plurality of wires 82 distributed such that the total weight of one of the pair of second wiring ducts 70 is substantially equal to the total weight of the other of the pair of second wiring ducts 70. A method for distributing the wires 82 is similar to a method for distributing the wires to the first wiring ducts 60.

(Regarding Parallelism Adjustment)

The parallelism adjustment of the Y-axis translational mechanism 2 is now described. According to this embodiment, the two translational drive portions 30 and the two translational guide portions 20 are arranged on each of the two first bases 10a, the two translational guide portions 20 are arranged on the single second base 10b, and the translational drive portions 30 and the translational guide portions 20 are concentrated on the three bases in total. Thus, the parallelism of the Y-axis translational mechanism 2 is ensured by two types of first parallelism between respective elements (the translational drive portions 30 and the translational guide portions 20) on each base and second parallelism between the respective bases.

The first parallelism is subjected to adjustment in the same base, and hence it is necessary to sufficiently accurately ensure the geometric tolerance and dimensional tolerance of each base. The geometric tolerance and the dimensional tolerance are mainly determined by the processing accuracy of the bases (the first bases 10*a* and the second base 10*b*). As described above, the first bases 10*a* and the second base 10*b* are configured by coupling a plurality of divided portions to each other. Thus, each of the divided portions is processed such that the same falls within a predetermined dimensional tolerance. The respective elements (the translational drive portions 30 and the translational guide portions 20) are mounted on the common base, and hence the geometric tolerance (parallelism) of the respective elements is determined by the processing accuracy of the bases. According to this embodiment, the predetermined dimensional tolerance is ensured for the divided portions divided in units of several meters, and if positions on which the respective elements are mounted meet the requirements for predetermined straightness and predetermined parallelism when the divided portions are coupled to each other, the parallelism between the respective elements can be ensured when the three bases are aligned parallel to each other (when the second parallelism is ensured). Therefore, if the processing of the bases themselves and the processing of mounting portions on the bases (such as tapping) are performed to meet the requirements, the first parallelism can be ensured.

The second parallelism is subjected to adjustment between the first bases 10*a* and the second base 10*b*, and hence only the geometric tolerance may be ensured. Thus, the second parallelism is determined by adjusting the mutual placement positions of the three bases (the first bases 10*a* and the second base 10*b*) in total. The placement position adjustment is performed by repeating fine adjustment while measuring intervals db (see FIG. 3) between the adjacent bases in the direction X. More specifically, parallelism adjustment is performed such that side surfaces of the slide blocks 23 of the linear movement guides 21 of the first bases 10*a* on both sides are parallel to side surfaces of the guide rails 22 of the central second base 10*b* closer to the first bases 10*a*, which are used as references. According to this embodiment, the respective elements are concentrated on the three bases such that it is only required to ensure the parallelism of the first bases 10*a* on both sides with respect to the second base 10*b*. If bases are further arranged outside the three bases, for example, it is necessary to change a measurement criterion, and hence accumulation of errors is generated. However, if the three bases are arranged as in this embodiment, parallelism adjustment is possible without generating accumulation of errors.

The above two types of parallelism and the dimensional tolerance are ensured such that parallelism between all the linear motors 31 and the linear movement guides 21 is ensured, and the movement stability is ensured. It is only required to ensure at least the parallelism of the linear movement guides 21 that are guide elements. After at least the parallelism of the linear movement guides 21 is ensured, the parallelism of the linear motors 31 is preferably adjusted to match with the linear movement guides 21.

Effects of this Embodiment

The effects of this embodiment are now described.

According to this embodiment, as hereinabove described, the driving simulation test apparatus 100 includes the translational drive portions 30 that include the plurality of linear motors 31 extending along the direction Y, and make the dome 1 perform translational movement in the direction Y, and the translational guide portions 20 that include the plurality of linear movement guides 21 extending along the direction Y, and serve as guides when the dome 1 performs translational movement, and the two translational drive portions 30 and the two translational guide portions 20 are aligned in the direction X on each of the two first bases 10*a*. Thus, the translational drive portions 30 and the translational guide portions 20 can be grouped in plural numbers to be concentrated on the common first bases 10*a*. Consequently, the Y-axis translational mechanism 2 that can make the dome 1 perform translational movement at a high acceleration and deceleration can be constructed simply by arranging around three bases 10 as in this embodiment. In this case, the parallelism of all the first bases 10*a* (the respective translational drive portions 30 and translational guide portions 20 placed on the first bases 10*a*) can be ensured simply by ensuring the parallelism between the adjacent first bases 10*a*, and hence accumulation of errors can be significantly reduced or prevented. Thus, in the driving simulation test apparatus 100 according to this embodiment, the parallelism adjustment of the linear motors 31 and the linear movement guides 21 can be facilitated even when the translational mechanism includes the linear motors 31 and the linear movement guides 21.

In the driving simulation test apparatus 100 according to this embodiment, the two first bases 10*a* are separately provided, whereby the large-size Y-axis translational mechanism 2 can be easily constructed. Furthermore, the translational drive portions 30 and the translational guide portions 20 are concentrated on each of the two first bases 10*a*, whereby the parallelism between the linear motors 31 (translational drive portions 30) and the linear movement guides 21 (translational guide portions 20) on each of the first bases 10*a* can be determined by the processing accuracy with respect to the first bases 10*a*.

In addition, in the driving simulation test apparatus 100 according to this embodiment, the parallelism adjustment is facilitated, and hence parallelism deteriorated across the ages can be promptly restored. Furthermore, high parallelism can be ensured, and hence the feed resistance of the linear movement guides 21 during translational movement can be reduced, and a variation in the clearance of the linear motors 31 can also be significantly reduced or prevented. Consequently, a theoretical thrust force value (design value) to be obtained by the translational drive portions 30 can be easily stably ensured.

According to this embodiment, as hereinabove described, the two first bases 10*a* are aligned at the interval in the direction X. Thus, the parallelism of each of the first bases 10*a* can be ensured without generating accumulation of errors simply by adjusting the first bases 10*a* adjacent to both sides of the center second base 10*b* to be parallel to the center second base 10*b* used as a reference. Therefore, even when the driving simulation test apparatus 100 includes the first bases 10*a* having a longer dimension of several tens of meters, the parallelism adjustment can be facilitated. Consequently, sufficient parallelism and dimensional tolerance can be ensured.

According to this embodiment, as hereinabove described, the two first bases 10*a* are arranged symmetrically or substantially symmetrically in the direction X with respect to the center of the Y-saddle 7 in the direction X in the planar view. Thus, the thrust force of the translational drive portions 30 in the direction Y can be evenly applied to the Y-saddle 7 as compared with the case where the first bases 10a are arranged at one position, and hence the moment (horizontal vibration) of the Y-saddle 7 in a rotational direction in the horizontal plane (in an X-Y plane) can be significantly reduced. Consequently, an increase in feed resistance caused by application of a large horizontal load to the linear movement guides 21 can be significantly reduced or prevented, and hence the dome 1 (Y-saddle 7) can perform translational movement at a high acceleration and deceleration.

According to this embodiment, as hereinabove described, the two first bases 10a are arranged at the positions that correspond to the Bessel points PB of the Y-saddle 7 in the direction X or the regions around the Bessel points PB, respectively. Thus, the deformation of the Y-saddle 7 supported on the first bases 10a (on the translational guide portions 20) can be reduced as much as possible while the total number of first bases 10a is reduced. In the driving simulation test apparatus 100 according to this embodiment, the Y-saddle 7 on which the X-axis translational mechanism 3 is placed is arranged on the Y-axis translational mechanism 2, and the dome 1 and the hexapod mechanism 4 are placed on the X-axis translational mechanism 3. Thus, although the total weight of the Y-saddle 7 including a placed member such as the dome 1 is likely to be increased, it is necessary to reduce the weight as much as possible in order to enable high acceleration and deceleration. The Y-saddle 7 has a structure that ensures minimum stiffness, but is deformable. The deformation of the Y-saddle 7 significantly influences translational movement, and hence the above structure significantly reduces or prevents the deformation such that the movement characteristics and controllability of the Y-saddle 7 (the dome 1 on the Y-saddle 7) can be improved.

According to this embodiment, as hereinabove described, the second base 10b is arranged at the position that passes through the center or near the center of the Y-saddle 7 in the direction X, and on the second base 10b, no translational drive portion 30 is provided, but the translational guide portions 20 are provided. Thus, the Y-saddle 7 can be supported and guided by the second base 10b between the two first bases 10a, and hence the deformation of the Y-saddle 7 can be more effectively significantly reduced or prevented. Furthermore, no translational drive portion 30 is provided on the second base 10b, and hence the complication of the apparatus structure can be significantly reduced even when the second base 10b is provided.

According to this embodiment, as hereinabove described, the pair of translational guide portions 20 is arranged near both ends of each of the first bases 10a in the direction X. The pair of translational drive portions 30 is arranged between the pair of translational guide portions 20 of each of the first bases 10a. Furthermore, the pair of translational drive portions 30 is arranged such that each of the second distances D2 between the translational drive portions 30 and the translational guide portions 20 adjacent thereto is smaller than the first distance D1 between the pair of translational drive portions 30. Thus, the second distances D2 between the translational drive portions 30 where points of application of thrust force are located and the translational guide portions 20 can be reduced. Consequently, the moment in the rotational direction that acts on the translational guide portions 20 in the horizontal plane (in the X-Y plane) can be reduced during generation of thrust force. Thus, an increase in the feed resistance of the linear movement guides 21 can be significantly reduced or prevented, and hence the dome 1 can perform translational movement at a high acceleration and deceleration.

According to this embodiment, as hereinabove described, each of the translational drive portions 30 includes the integrated four linear motors 31. Thus, parallelism between the linear motors 31 can be ensured at the stage for assembling and integrating the four linear motors 31, and hence parallelism adjustment between the linear motors 31 can be finished simply by adjusting parallelism, using the integrated four linear motors 31 as a unit. Consequently, the parallelism adjustment of each of the linear motors 31 can be facilitated as compared with the case where the same number of linear motors 31 is arranged individually.

According to this embodiment, as hereinabove described, the translational drive portions 30 include the coreless linear motors 31. Thus, unlike the case where cored linear motors are used, generation of uneven thrust force caused by cogging can be prevented by the coreless linear motors 31. Furthermore, even when the plurality of coreless linear motors 31 is provided as in this embodiment, the parallelism adjustment of each of the coreless linear motors 31 can be facilitated by concentrating and arranging the plurality of coreless linear motors 31 on the common first bases 10a.

In a typical driving simulation test apparatus, various wires and hoses for simulation display and audio output in a movable body, sensing of a driving operation, etc. are wired to an upper portion of the movable body. These wires and hoses are housed in wiring ducts that follow the movement of the movable body (saddle). The wires are large in number, and hence the wiring ducts are also heavy in total weight.

Consequently, the magnitudes of resistances involved with the movement of the wiring ducts may vary by the arrangement of the wiring ducts from when translational mechanisms move the wiring ducts to first sides and to when the translational mechanisms move the wiring ducts to second sides. When a linear motor drive system is employed, a frictional resistance can be reduced as much as possible, and hence an unbalanced resistance involved with the movement of the wiring ducts, which hardly becomes a problem in a belt drive system in which a frictional resistance is large, cannot be ignored. More specifically, in the linear motor drive system, the uneven thrust force of linear motors is disadvantageously generated by the unbalanced resistance involved with the movement of the wiring ducts that follow the translational driving of the movable body. Particularly, in a driving simulation test apparatus in which it is necessary to make a movable body perform translational movement at a high acceleration and a high speed, a thrust force is preferably balanced by significantly reducing or preventing the uneven thrust force of linear motors.

Thus, according to this embodiment, as hereinabove described, the driving simulation test apparatus 100 includes the pairs of first wiring ducts 60 that are arranged below the Y-saddle 7, extend in the direction Y, and are connected to the Y-saddle 7 to be moved in the direction Y following the translational movement of the Y-saddle 7 in the direction Y. Furthermore, when the Y-saddle 7 is located at the center of the Y-axis translational mechanism 2 in the planar view, the pairs of first wiring ducts 60 are arranged symmetrically or substantially symmetrically in the direction Y with respect to the Y-saddle 7. Thus, even when the Y-saddle 7 is moved to any of the Y1 side and the Y2 side, the resistance of the first wiring ducts 60 on both sides can be uniformized.

Specifically, when the Y-saddle 7 is moved from the center to the Y1 side, as shown in FIG. 8, the first wiring ducts 60 located on the Y1 side are pushed to the Y1 side, and the first wiring ducts 60 located on the Y2 side are pulled to the Y1 side. A resistance in the case where the first wiring ducts 60 are pushed is not necessarily equal to a resistance in the case where the first wiring ducts 60 are pulled, and the resistance in the case where the first wiring ducts 60 are pulled is larger. Thus, when the wiring ducts are provided only on one side (the Y2 side, for example) with respect to the Y-saddle 7 and all the wires are concentrated on one side, a resistance in the case where the Y-saddle 7 is moved to the Y1 side is different from a resistance in the case where the Y-saddle 7 is moved to the Y2 side, and hence the uneven thrust force of the linear motors 31 is generated due to a movement direction.

On the other hand, according to this embodiment, the pairs of first wiring ducts 60 are provided symmetrically or substantially symmetrically in the direction Y with respect to the Y-saddle 7, whereby even when the Y-saddle 7 is moved to any of the Y1 side and the Y2 side, the first wiring ducts 60 on a traveling direction side are pushed to be moved, and the first wiring ducts 60 on an opposite direction side are pulled to be moved. Thus, a resistance due to the first wiring ducts 60 can be substantially equalized regardless of a movement direction. Consequently, in the driving simulation test apparatus 100 according to this embodiment, generation of the uneven thrust force of the linear motors 31 caused by an unbalanced resistance involved with the movement of the first wiring ducts 60 that follows the translational driving of the dome 1 can be significantly reduced or prevented.

According to this embodiment, as hereinabove described, each pair of first wiring ducts 60 extends from the Y-saddle 7 to the Y1 side and the Y2 side, respectively, and has the lengths substantially equal to each other. Thus, the first wiring ducts 60 on the Y1 side and the Y2 side can be easily symmetrical or substantially symmetrical to each other. Furthermore, the lengths of each pair of first wiring ducts 60 are substantially equalized, whereby the resistance due to each pair of first wiring ducts 60, which is to be generated when the Y-saddle 7 is moved, can be more accurately uniformized on the Y1 side and the Y2 side.

According to this embodiment, as hereinabove described, the plurality of wires (81, 82) distributed such that the total weight of one of the pair of first wiring ducts 60 is substantially equal to the total weight of the other of the pair of first wiring ducts 60 are housed in each of the pair of first wiring ducts 60. Thus, the inertial resistance of the first wiring ducts 60, which is to be generated when the Y-saddle 7 is moved along the direction Y, can also be substantially equalized on the Y1 side and the Y2 side. Thus, the resistance due to the pair of first wiring ducts 60, which is to be generated when the Y-saddle 7 is moved, can be further uniformized.

According to this embodiment, as hereinabove described, each pair of first wiring ducts 60 has the folded structure in which the same extends to the Y1 side and the Y2 side in the direction Y, respectively, and thereafter is folded back over in the planar view and extends to the central portion of the Y-saddle 7. Furthermore, the first ends 61 of each pair of first wiring ducts 60 closer to the center in the direction X are arranged near the central portion of the Y-saddle 7 in the planar view, and the second ends 62 of each pair of first wiring ducts 60 are fixed to the positions below the first ends 61 in the vicinity of the central portion of the Y-axis translational mechanism 2 in the planar view. Thus, when the Y-saddle 7 is located at the center of the Y-axis translational mechanism 2, the first ends 61 and the second ends 62 of each pair of first wiring ducts 60 can be arranged near the central portion of the Y-saddle 7 immediately below the dome 1 (see FIG. 2). Consequently, the path lengths of the wires or the like to be wired from on the Y-saddle 7 to the dome 1 can be reduced as much as possible, and hence the acceleration and deceleration performance can be improved by reducing the weight of members placed on the Y-axis translational mechanism 2 while the complication of the apparatus structure (wiring structure) can be significantly reduced or prevented.

According to this embodiment, as hereinabove described, when the Y-saddle 7 and the X-saddle 6 are located at the center of the Y-axis translational mechanism 2 and the center of the X-axis translational mechanism 3, respectively, the pair of first wiring ducts 60 and the pair of second wiring ducts 70 are arranged in a cross shape in the planar view. Thus, the resistance due to the pair of first wiring ducts 60, which is to be generated when the Y-saddle 7 is moved in the direction Y, can be uniformized, and furthermore the resistance due to the pair of second wiring ducts 70, which is to be generated when the X-saddle 6 is moved in the direction X, can be substantially equalized on the X1 side and the X2 side. Therefore, even in the structure including a 2-axis translational mechanism capable of moving in the directions X and Y, generation of the uneven thrust force of the linear motors (31, 51) caused by the unbalanced resistance involved with the movement of the wiring ducts (60, 70) in both the directions X and Y can be significantly reduced or prevented.

According to this embodiment, as hereinabove described, each pair of second wiring ducts 70 extends from the X-saddle 6 to the X1 side and the X2 side, respectively, and has the lengths substantially equal to each other. Thus, the second wiring ducts 70 on the X1 side and the X2 side can be easily symmetrical or substantially symmetrical to each other. Furthermore, the lengths of each pair of second wiring ducts 70 are substantially equalized, whereby the resistance due to each pair of second wiring ducts 70, which is to be generated when the X-saddle 6 is moved, can be more accurately uniformized on the X1 side and the X2 side.

According to this embodiment, as hereinabove described, each pair of second wiring ducts 70 has the folded structure in which the same extends to the X1 side and the X2 side, respectively, and thereafter is folded back over in the planar view and extends to the central portion of the X-saddle 6. Furthermore, the first ends 71 of each pair of second wiring ducts 70 are connected to the vicinity of the central portion of the X-saddle 6 in the planar view, and the second ends 72 of each pair of second wiring ducts 70 are fixed to the positions below the first ends 71 in the vicinity of the central portion of the X-axis translational mechanism 3 in the planar view. Thus, when the X-saddle 6 is located at the center of the X-axis translational mechanism 3, the first ends 71 and the second ends 72 of each pair of second wiring ducts 70 can be arranged near the central portion of the X-saddle 6 immediately below the dome 1 (see FIG. 2). Consequently, the path lengths of the wires or the like to be wired from on the X-saddle 6 to the dome 1 can be reduced as much as possible, and hence the acceleration and deceleration performance can be improved by reducing the weight of members placed on the X-axis translational mechanism 3 while the complication of the apparatus structure (wiring structure) can be significantly reduced or prevented.

According to this embodiment, as hereinabove described, when the Y-saddle 7 is located at the center of the Y-axis translational mechanism 2 in the planar view, the four sets (pairs) of first wiring ducts 60 are arranged symmetrically or substantially symmetrically in the direction X with respect to the central portion of the Y-saddle 7 in the planar view. Thus, even when a plurality of sets (pairs) of first wiring ducts 60 are provided, the resistance due to the pairs of first wiring ducts 60, which is to be generated when the Y-saddle 7 is moved, can be uniformized on the Y1 side and the Y2 side. Furthermore, positions on which the resistance due to the first wiring ducts 60 acts are symmetrical or substantially symmetrical in the direction X, and hence bending moment that acts on the Y-saddle 7 due to the resistance can be balanced. Consequently, the asymmetrical deformation of the Y-saddle 7 that becomes a factor for the uneven thrust force of the linear motors 31 can be significantly reduced or prevented.

According to this embodiment, as hereinabove described, the pairs of first wiring ducts 60 extend along the direction Y between the pair of translational guide portions 20 on the second base 10b. Thus, a frictional resistance following the guiding of the Y-saddle 7 in the direction Y can be effectively reduced by the translational guide portions 20. Furthermore, the second base 10b that serves as a portion on which the pair of translational guide portions 20 is placed can also serve as a portion on which the pairs of first wiring ducts 60 are placed, and hence the complication of the apparatus structure can be significantly reduced or prevented as compared with the case where the second base 10b for the translational guide portions 20 and a base for the first wiring ducts 60 are separately provided.

According to this embodiment, as hereinabove described, the first wiring ducts 60 near both ends of the Y-saddle 7 house the wires 81 to the movable elements of the linear motors 31 of the Y-axis translational mechanism 2, and the first wiring ducts 60 at the central portion of the Y-saddle 7 house the wires 82 to the dome 1. Thus, the first wiring ducts 60 at the central portion of the Y-saddle 7 located immediately below the dome 1 house the wires 82 to the dome 1, whereby the path lengths of the wires 81 to the dome 1 can be reduced as much as possible. Furthermore, the power wires (wires 81) to the movable elements, which are likely to be thick and heavy in order to supply a large amount of electric power as compared with the wires 82 to the dome 1, can be distributed to the first wiring ducts 60 on the X1 side and the X2 side, and hence the weights of the first wiring ducts 60 can be balanced. Consequently, the resistance of each set (pair) of first wiring ducts 60 can be uniformized, and hence generation of the uneven thrust force of the linear motors 31 can be more effectively significantly reduced or prevented.

[Modification]

The embodiment disclosed this time must be considered as illustrative in all points and not restrictive. The range of the present invention is shown not by the above description of the embodiment but by the scope of claims for patent, and all modifications within the meaning and range equivalent to the scope of claims for patent are further included.

For example, while the driving simulation test apparatus 100 that is translatable in the direction X and the direction Y is shown in the aforementioned embodiment, the present invention is not restricted to this. The present invention may alternatively be applied to a driving simulation test apparatus that is movable with respect to only one axis (an X-axis or a Y-axis), for example. More specifically, the X-axis translational mechanism 3 and the X-saddle 6 may be omitted.

While the two first bases 10a and the single second base 10b are provided in the aforementioned embodiment, the present invention is not restricted to this. According to the present invention, instead of the second base 10b, another first base 10a may alternatively be provided, and a total of three first bases 10a may alternatively be provided. Alternatively, no second base 10b may be provided, and only the two first bases 10a may be provided.

While the two translational drive portions 30 are provided on each of the first bases 10a in the aforementioned embodiment, the present invention is not restricted to this. According to the present invention, three or more translational drive portions 30 may alternatively be provided on each of the first bases 10a.

While the pair of translational drive portions 30 is arranged such that each of the second distances D2 between the translational drive portions 30 and the translational guide portions 20 adjacent to the translational drive portions 30 is smaller than the first distance D1 between the pair of translational drive portions 30 in the aforementioned embodiment, the present invention is not restricted to this. According to the present invention, the first distance D1 and each of the second distances D2 may alternatively be equal to each other, or each of the second distances D2 may alternatively be larger than the first distance D1.

Figure 11:
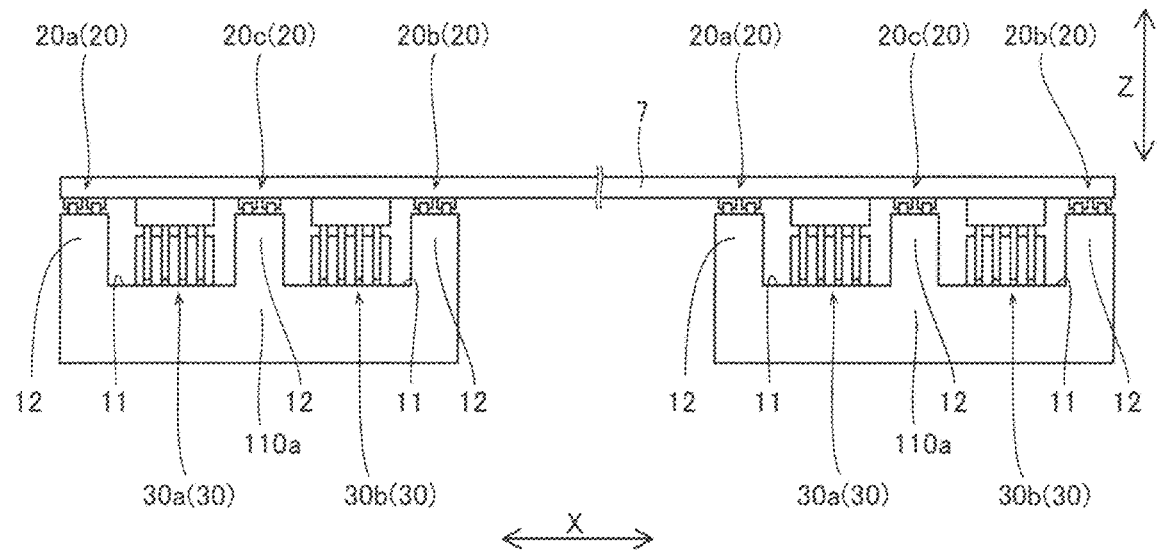
FIG. 11 is a schematic view showing a first base according a first modification of the driving simulation test apparatus.

While the two translational guide portions 20 are provided on each of the first bases 10a in the aforementioned embodiment, the present invention is not restricted to this. According to the present invention, one or three or more translational guide portions 20 may alternatively be placed on each of the first bases 10a. For example, as in a first modification shown in FIG. 11, two recess portions 11 and three wall portions 12 may be provided on each of first bases 110a, and a total of three translational guide portions 20 may be placed on the three wall portions 12, respectively. In the first modification shown in FIG. 11, the three translational guide portions 20 and two translational drive portions 30 are alternately aligned in a direction X. Similarly in the second base 10b, three or more translational guide portions 20 may alternatively be placed.

While each of the translational drive portions 30 includes the integrated four linear motors 31 in the aforementioned embodiment, the present invention is not restricted to this. According to the present invention, the linear motors 31 of each of the translational drive portions 30 may not be integrated, but may alternatively be provided separately.

While each of the translational drive portions 30 includes the four linear motors 31 in the aforementioned embodiment, the present invention is not restricted to this. According to the present invention, each of the translational drive portions 30 may alternatively include a number of linear motors 31 other than four. The number of linear motors 31 provided in each of the translational drive portions 30 may be a number according to required total thrust force, the number of translational drive portions 30 to be placed, or the like.

While each of the translational drive portions 30 includes the coreless linear motors 31 in the aforementioned embodiment, the present invention is not restricted to this. According to the present invention, each of the translational drive portions 30 may alternatively include cored linear motors.

While each of the translational guide portions 20 includes the two linear movement guides 21 in the aforementioned embodiment, the present invention is not restricted to this. According to the present invention, each of the translational guide portions 20 may alternatively include a number of linear movement guides 21 other than two. The number of linear movement guides 21 provided in each of the translational guide portions 20 may be a number according to the weight of placed members, the number of translational guide portions 20 to be placed, or the like.

Figure 12:
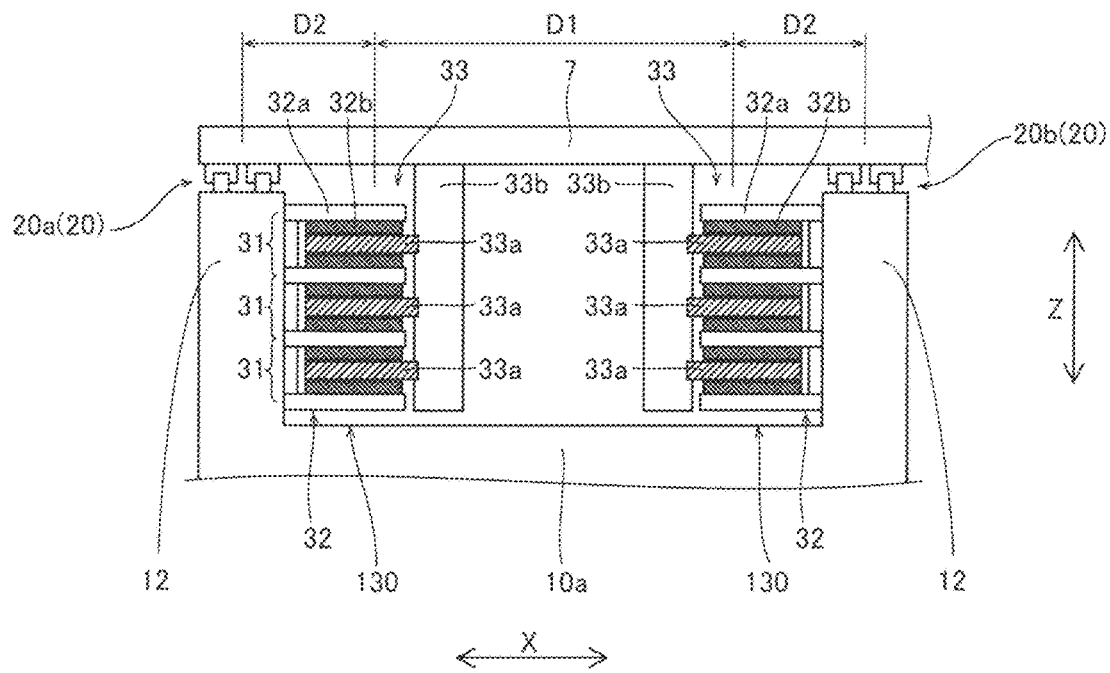
FIG. 12 is a schematic view showing a first base according a second modification of the driving simulation test apparatus.

While the linear motors 31 in which the permanent magnets 32b face the coil portions 33a in the direction X are shown in the aforementioned embodiment, the present invention is not restricted to this. As in a second modification shown in FIG. 12, each of translational drive portions 130 may alternatively include linear motors 31 in which permanent magnets 32b face coil portions 33a in a direction Z (vertically). In each of the translational drive portions 130 according to the second modification shown in FIG. 12, a stator unit 32 is placed on an inner surface of each of wall portions 12, and support walls 32a aligned in the direction Z protrude in a direction X. A movable element unit 33 includes a support block 33b that vertically extends, and the coil portions 33a extend in the direction X from the support block 33b and are arranged between the support walls 32a (between the permanent magnets 32b).

While the linear motors 31 in which the movable elements serve as coils (coil portions 33a) and the stators serve as magnets (permanent magnets 32b) are provided in the aforementioned embodiment, the present invention is not restricted to this. According to the present invention, the movable elements may alternatively serve as magnets, and the stators may alternatively serve as coils. Furthermore, according to the present invention, both the movable elements and the stators may alternatively serve as coils.

While the two first bases 10a are arranged at the positions that correspond to the Bessel points PB of the Y-saddle 7 or the regions around the Bessel points PB, respectively, in the aforementioned embodiment, the present invention is not restricted to this. According to the present invention, the two first bases 10a may alternatively be arranged at positions other than the Bessel points PB of the Y-saddle 7. For example, the two first bases 10a may be arranged to support both ends of the Y-saddle 7, respectively.

While the single translational drive portion 50 is provided on the X-axis translational mechanism 3 in the aforementioned embodiment, the present invention is not restricted to this. According to the present invention, a plurality of translational drive portions 50 may alternatively be provided on the X-axis translational mechanism 3.

While the translational drive portion 50 includes the three linear motors 51 in the aforementioned embodiment, the present invention is not restricted to this. According to the present invention, the translational drive portion 50 may alternatively include a number of linear motors 51 other than three.

While the four translational guide portions 40 are provided on the X-axis translational mechanism 3 in the aforementioned embodiment, the present invention is not restricted to this. According to the present invention, a number of translational guide portions 40 other than four may alternatively be provided on the X-axis translational mechanism 3.

While each of the translational guide portions 40 includes one or the two linear movement guides 41 in the aforementioned embodiment, the present invention is not restricted to this. According to the present invention, each of the translational guide portions 40 may alternatively include three or more linear movement guides 41.

While the four sets (four pairs) of first wiring ducts 60 are provided in the aforementioned embodiment, the present invention is not restricted to this. According to the present invention, so far as the first wiring ducts 60 are provided using a pair of first wiring ducts 60 on the Y1 side and the Y2 side as a unit, sets of first wiring ducts 60 other than four sets may alternatively be provided. Similarly in the second wiring ducts 70, sets (pairs) of second wiring ducts 70 other than two sets (two pairs) may alternatively be provided.

While the wires (81, 82) are distributed to and housed in each of the pair of first wiring ducts 60 such that the total weight of one of the pair of first wiring ducts 60 is substantially equal to the total weight of the other of the pair of first wiring ducts 60 in the aforementioned embodiment, the present invention is not restricted to this. According to the present invention, the total weight of one of the pair of first wiring ducts 60 may alternatively be different from the total weight of the other of the pair of first wiring ducts 60. Similarly in the pair of second wiring ducts 70, the total weight of one of the pair of second wiring ducts 70 may alternatively be different from the total weight of the other of the pair of second wiring ducts 70.

While each pair of second wiring ducts 60 has the folded structure in which the same is vertically folded back over in the planar view in the aforementioned embodiment, the present invention is not restricted to this. According to the present invention, each pair of first wiring ducts 60 may alternatively have a structure in which the same is folded back in the horizontal plane. More specifically, the first wiring ducts 60 may extend in the direction Y away from the Y-saddle 7, and thereafter be folded back in a U-shape in the planar view and extend in the direction Y toward the Y-saddle 7. Similarly in the second wiring ducts 70, each pair of second wiring ducts 70 may has a folded structure in which the same is in a U-shape in the planar view.

While the first ends 61 of each pair of first wiring ducts 60 are arranged near the central portion of the Y-saddle 7, and the second ends 62 of each pair of first wiring ducts 60 are fixed to the vicinity of the central portion of the Y-axis translational mechanism 2 in the aforementioned embodiment, the present invention is not restricted to this. According to the present invention, the first ends 61 may alternatively be arranged on end edges of the Y-saddle 7 in the direction Y, for example. In this case, it is only required that the positions of the first ends 61 of each pair of first wiring ducts 60 be symmetrical or substantially symmetrical in the direction Y with respect to the Y-saddle 7 in the planar view. Furthermore, the second ends 62 may alternatively be arranged at positions deviated in the direction Y from the central portion of the Y-axis translational mechanism 2. In this case, it is only required that the positions of the second ends 72 of each pair of second wiring ducts 70 be symmetrical or substantially symmetrical in the direction Y with respect to the central portion of the Y-axis translational mechanism 2 in the planar view.

Similarly, while the first ends 71 of each pair of second wiring ducts 70 are arranged near the central portion of the X-saddle 6, and the second ends 72 of each pair of second wiring ducts 70 are fixed to the vicinity of the central portion of the X-axis translational mechanism 3 in the aforementioned embodiment, the present invention is not restricted to this. According to the present invention, the first ends 71 may alternatively be arranged on end edges of the X-saddle 6 in the direction X such that the positions of the first ends 71 of each pair of second wiring ducts 70 are symmetrical or substantially symmetrical in the direction X with respect to the X-saddle 6 in the planar view, for example. Furthermore, the second ends 72 may alternatively be arranged at positions deviated in the direction X from the central portion of the X-axis translational mechanism 3 such that the positions of the second ends 72 of each pair of second wiring ducts 70 are symmetrical or substantially symmetrical in the direction X with respect to the central portion of the X-axis translational mechanism 3 in the planar view.

While the four sets (four pairs) of first wiring ducts 60 are arranged symmetrically or substantially symmetrically not only in the direction Y but also in the direction X with respect to the central portion of the Y-saddle 7 in the aforementioned embodiment, the present invention is not restricted to this. The first wiring ducts 60 may alternatively be arranged asymmetrically in the direction X.

While the two sets (two pairs) of first wiring ducts 60 at the central portion in the direction X are arranged between the pair of translational guide portions 20 on the second base 10b in the aforementioned embodiment, the present invention is not restricted to this. According to the present invention, duct supports 65 for the two sets (two pairs) of first wiring ducts 60 at the central portion in the direction X may alternatively be provided separately, and the two sets (two pairs) of first wiring ducts 60 at the central portion in the direction X may alternatively be arranged on the duct supports 65, similarly to the two sets (two pairs) of first wiring ducts 60 at both ends in the direction X.

While the first wiring ducts 60 near both ends of the Y-saddle 7 house the wires 81 to the movable elements of the linear motors 31 of the Y-axis translational mechanism 2, and the first wiring ducts 60 at the central portion of the Y-saddle 7 house the wires 82 to the dome 1 in the aforementioned embodiment, the present invention is not restricted to this. The first wiring ducts 60 near both ends of the Y-saddle 7 may alternatively house the wires 82 to the dome 1, and the first wiring ducts 60 at the central portion of the Y-saddle 7 may alternatively house the wires 81 to the movable elements.

The dimensions of the first bases 10a, the second base 10b, the first wiring ducts 60, the second wiring ducts 70, the X-saddle 6, the Y-saddle 7, etc. and the numerical values of the strokes, the accelerations, etc. of the translational mechanisms, which are described in the aforementioned embodiment, are shown as examples for reference, and the present invention is not restricted to these.

What is claimed is:

1. A driving simulation test apparatus comprising:
   a movable body that includes a simulated vehicle and that is configured to perform translational movement in a first direction;
   a first translational drive portion that includes one or more linear motors that extend along the first direction, and that is configured to make the movable body perform translational movement in the first direction;
   a first translational guide portion that includes one or more linear movement guides that extend along the first direction, and that is configured to serve as a guide when the movable body performs translational movement; and
   a plurality of first bases, wherein each first base extends along the first direction and is spaced from each other first base in a second direction perpendicular to the first direction in a planar view, wherein
   the first translational drive portion and the first translational guide portion are aligned in the second direction on each of the plurality of first bases,
   the first translational drive portion includes a plurality of first translational drive portions aligned in the second direction on each of the first bases,
   the first translational guide portion includes a pair of first translational guide portions arranged near both ends of each of the first bases in the second direction,
   the first translational drive portion includes a pair of first translational drive portions arranged between the pair of first translational guide portions of each of the first bases, and
   the pair of first translational drive portions is arranged such that a second distance between the first translational drive portion and the first translational guide portion adjacent to the first translational drive portion is smaller than a first distance between the pair of first translational drive portions.

2. The driving simulation test apparatus according to claim 1, wherein
   the first translational drive portion includes the linear motors that are integrated with each other.

3. The driving simulation test apparatus according to claim 1, wherein
   the one or more linear motors are coreless linear motors.

4. The driving simulation test apparatus according to claim 1, wherein the first bases include two or three first bases aligned at intervals in the second direction.

5. The driving simulation test apparatus according to claim 4, wherein
   the movable body is supported by a first support supported by the first translational guide portion such that the same is movable in the second direction, and
   the plurality of first bases includes two first bases arranged symmetrically or substantially symmetrically in the second direction with respect to a center of the first support in the second direction in the planar view.

6. The driving simulation test apparatus according to claim 5, wherein
   the two first bases are arranged at positions that correspond to Bessel points of the first support in the second direction or regions around the Bessel points, respectively.

7. The driving simulation test apparatus according to claim 5, further comprising a second base arranged at a position that passes through the center of the first support in the second direction or near the center of the first support in the second direction, wherein
   on the second base, the first translational guide portion is provided and no first translational drive portion is provided.

8. A driving simulation test apparatus comprising:
   a movable body that includes a simulated vehicle and that is configured to perform translational movement in a first direction;
   a first support that supports the movable body;
   a first translational drive portion that includes one or more linear motors that extend along the first direction, and that is configured to make the movable body perform translational movement in the first direction;
   a first translational guide portion that includes one or more linear movement guides that extend along the first direction, and that is configured to serve as a guide when the movable body performs translational movement; and
   a plurality of first bases, wherein each first base extends along the first direction and is spaced from each other first base in a second direction perpendicular to the first direction in a planar view;
   a first translational mechanism that includes the first bases provided below the first support, the first translational drive portion provided below the first support, and the first translational guide portion provided below the first support, wherein the first translational mechanism is configured to make the first support perform translational movement in the first direction; and a pair of first wiring ducts that is arranged below the first support, extends in the first direction, and is connected to the first support to be moved in the first direction following translational movement of the first support in the first direction, wherein the first translational drive portion and the first translational guide portion are aligned in the second direction on each of the plurality of first bases, the first translational drive portion includes a plurality of first translational drive portions aligned in the second direction on each of the first bases, and when the first support is located at a center of the first translational mechanism in the planar view, the pair of first wiring ducts is provided symmetrically or substantially symmetrically in the first direction with respect to the first support.

9. The driving simulation test apparatus according to claim 8, wherein the pair of first wiring ducts has a folded structure extending to a first side and a second side in the first direction, respectively, and thereafter being folded back over in the planar view and extending to a central portion of the first support, a first end of each of the pair of first wiring ducts is arranged near the central portion of the first support in the planar view, and a second end of each of the pair of first wiring ducts is fixed to a position below the first end in a vicinity of a central portion of the first translational mechanism in the planar view.

10. The driving simulation test apparatus according to claim 8, wherein the pair of first wiring ducts includes pairs of first wiring ducts, and when the first support is located at the center of the first translational mechanism in the planar view, the pairs of first wiring ducts are arranged symmetrically or substantially symmetrically in the first direction and in the second direction with respect to a central portion of the first support.

11. The driving simulation test apparatus according to claim 8, wherein the first translational mechanism includes:
  a second base that extends along the first direction at a central portion of the first translational mechanism in the second direction, and
  a pair of first translational guide portions provided on the second base, and the pair of first wiring ducts extends along the first direction between the pair of first translational guide portions on the second base.

12. The driving simulation test apparatus according to claim 8, wherein the one or more linear motors of the first translational mechanism are arranged on each of a first side and a second side in the second direction with respect to a central portion of the first translational mechanism in the second direction, the pair of first wiring ducts is provided near both ends of the first support in the second direction and at a central portion of the first support in the second direction, the pair of first wiring ducts near both the ends of the first support houses wires electrically coupled to movable elements of the one or more linear motors of the first translational mechanism, and the pair of first wiring ducts at the central portion of the first support houses wires electrically coupled to the movable body.

13. The driving simulation test apparatus according to claim 8, wherein the pair of first wiring ducts extends from the first support to a first side and a second side in the first direction, respectively, and a length of one of the pair of first wiring ducts is substantially equal to a length of the other of the pair of first wiring ducts.

14. The driving simulation test apparatus according to claim 13, wherein each of the pair of first wiring ducts houses a plurality of wires distributed such that a total weight of one of the pair of first wiring ducts is substantially equal to a total weight of the other of the pair of first wiring ducts.

15. The driving simulation test apparatus according to claim 8, further comprising:

a second translational mechanism that includes a second support that supports the movable body on the first support, a second translational drive portion that is placed on the first support and includes one or more linear motors extending along the second direction, and a second translational guide portion that includes one or more linear movement guides extending along the second direction, wherein the second translational mechanism is configured to make the second base perform translational movement in the second direction; and a pair of second wiring ducts that extends in the second direction and is connected to the first support and the second support, wherein when the first support and the second support are located at centers of the first translational mechanism and the second translational mechanism, respectively, the pair of first wiring ducts and the pair of second wiring ducts are arranged in a cross shape in the planar view.

16. The driving simulation test apparatus according to claim 15, wherein the pair of second wiring ducts extends from the second support to a first side and a second side in the second direction, respectively, and a length of one of the pair of second wiring ducts is substantially equal to a length of the other of the pair of second wiring ducts.

17. The driving simulation test apparatus according to claim 15, wherein the pair of second wiring ducts has a folded structure extending to a first side and a second side in the second direction, respectively, and thereafter being folded back over in the planar view and extending to a central portion of the second support, a first end of each of the pair of second wiring ducts is connected to a vicinity of the central portion of the second support in the planar view, and a second end of each of the pair of second wiring ducts is fixed to a position below the first end in a vicinity of a central portion of the second translational mechanism in the planar view.

* * * * *